United States Patent
Nakata

(10) Patent No.: US 8,934,039 B2
(45) Date of Patent: Jan. 13, 2015

(54) EXTERNAL EQUIPMENT STORING MANIPULATION INFORMATION AND OPERATION INFORMATION AND CAMERA SYSTEM USING SUCH INFORMATION

(75) Inventor: Koichi Nakata, Kokubunji (JP)

(73) Assignee: Olympus Imaging Corp., Tokyo (JP)

( * ) Notice: Subject to any disclaimer, the term of this patent is extended or adjusted under 35 U.S.C. 154(b) by 72 days.

(21) Appl. No.: 13/543,378

(22) Filed: Jul. 6, 2012

(65) Prior Publication Data
US 2013/0016268 A1 Jan. 17, 2013

(30) Foreign Application Priority Data
Jul. 15, 2011 (JP) .................................. 2011-156600

(51) Int. Cl.
| | | |
|---|---|---|
| H04N 5/222 | (2006.01) | |
| G03B 17/14 | (2006.01) | |
| H04N 5/225 | (2006.01) | |
| H04N 5/232 | (2006.01) | |
| G03B 17/18 | (2006.01) | |

(52) U.S. Cl.
CPC .............. *G03B 17/14* (2013.01); *H04N 5/225* (2013.01); *H04N 5/232* (2013.01); *H04N 5/23209* (2013.01); *G03B 17/18* (2013.01); *G03B 2206/00* (2013.01)
USPC .................................................. 348/333.01

(58) Field of Classification Search
USPC .................................................. 348/333.01
See application file for complete search history.

(56) References Cited

U.S. PATENT DOCUMENTS

| | | | | |
|---|---|---|---|---|
| 8,350,945 | B2 * | 1/2013 | Yumiki ..................... | 348/333.02 |
| 8,488,038 | B2 * | 7/2013 | Suzuki et al. ............ | 348/333.01 |
| 2006/0072028 | A1 * | 4/2006 | Hong ........................ | 348/333.01 |
| 2008/0199170 | A1 * | 8/2008 | Shibuno et al. ............... | 396/125 |
| 2009/0284612 | A1 * | 11/2009 | Abe et al. .................... | 348/221.1 |
| 2010/0066864 | A1 * | 3/2010 | Abe ............................ | 348/240.3 |
| 2010/0208122 | A1 * | 8/2010 | Yumiki ..................... | 348/333.08 |
| 2010/0214465 | A1 * | 8/2010 | Suzuki et al. ............ | 348/333.02 |
| 2010/0238321 | A1 * | 9/2010 | Honjo et al. ............. | 348/231.99 |
| 2012/0105588 | A1 * | 5/2012 | Yamamoto ....................... | 348/46 |
| 2012/0243856 | A1 * | 9/2012 | Shibuno .......................... | 396/76 |
| 2012/0328277 | A1 * | 12/2012 | Nakata et al. ................. | 396/131 |
| 2013/0064533 | A1 * | 3/2013 | Nakata ........................... | 396/76 |

FOREIGN PATENT DOCUMENTS

JP 2010-181725 8/2010

* cited by examiner

*Primary Examiner* — Nicholas Giles
*Assistant Examiner* — Abdelaaziz Tissire
(74) *Attorney, Agent, or Firm* — John C. Pokotylo; Straub & Pokotylo

(57) ABSTRACT

Equipment detachable from a body portion of the camera system includes: a communication unit communicating with the body; a storage unit storing manipulation information corresponding to a manipulation type of the camera system and operation information related to an operation of the camera system corresponding to the manipulation type; and a control unit transmitting the manipulation and operation information to the body when the external equipment is attached to the body, causes the camera system to display the manipulation image data based on the manipulation information, causes the camera system to perform an operation based on the operation information, and removes the display of manipulation image data when the external equipment is detached from the body portion.

12 Claims, 33 Drawing Sheets

| MANIPULATION TYPE | ICON DISPLAY POSITION | ICON DISPLAY SIZE | ICON IMAGE |
|---|---|---|---|
| WIDE ANGLE-SIDE ZOOM DRIVING | (10, 15) | 30 × 30 | IMAGE DATA 1 (W-ICON) |
| TELE-SIDE ZOOM DRIVING | (60, 15) | 30 × 30 | IMAGE DATA 2 (T-ICON) |
| NEAR-SIDE FOCUS DRIVING | (10, 65) | 30 × 30 | IMAGE DATA 3 (N-ICON) |
| FAR-SIDE FOCUS DRIVING | (60, 65) | 30 × 30 | IMAGE DATA 4 (F-ICON) |

FIG.5

| MANIPULATION TYPE | MANIPULATION CORRESPONDENCE DATA |
|---|---|
| WIDE ANGLE-SIDE ZOOM DRIVING | COMMAND INFORMATION 1 (DRIVING COMMAND, STOP COMMAND) |
| TELE-SIDE ZOOM DRIVING | COMMAND INFORMATION 2 (DRIVING COMMAND, STOP COMMAND) |
| NEAR-SIDE FOCUS DRIVING | COMMAND INFORMATION 3 (DRIVING COMMAND, STOP COMMAND) |
| FAR-SIDE FOCUS DRIVING | COMMAND INFORMATION 4 (DRIVING COMMAND, STOP COMMAND) |

FIG.10

| MANIPULATION TYPE | ICON DISPLAY POSITION | ICON DISPLAY SIZE | ICON IMAGE | MANIPULATION CORRESPONDENCE IMAGE DATA |
|---|---|---|---|---|
| WIDE ANGLE-SIDE ZOOM DRIVING | (10, 15) | 30 × 30 | IMAGE DATA 1 (W-ICON) | |
| TELE-SIDE ZOOM DRIVING | (60, 15) | 30 × 30 | IMAGE DATA 2 (T-ICON) | |
| NEAR-SIDE FOCUS DRIVING | (10, 65) | 30 × 30 | IMAGE DATA 3 (N-ICON) | |
| FAR-SIDE FOCUS DRIVING | (60, 65) | 30 × 30 | IMAGE DATA 4 (F-ICON) | |
| LENS INFORMATION DISPLAY | (10, 115) | 30 × 30 | IMAGE DATA 5 (I-ICON) | LENS INFORMATION IMAGE DATA |
| MANIPULATION GUIDE DISPLAY | (60, 115) | 30 × 30 | IMAGE DATA 6 (G-ICON) | MANIPULATION GUIDE IMAGE DATA |

T3

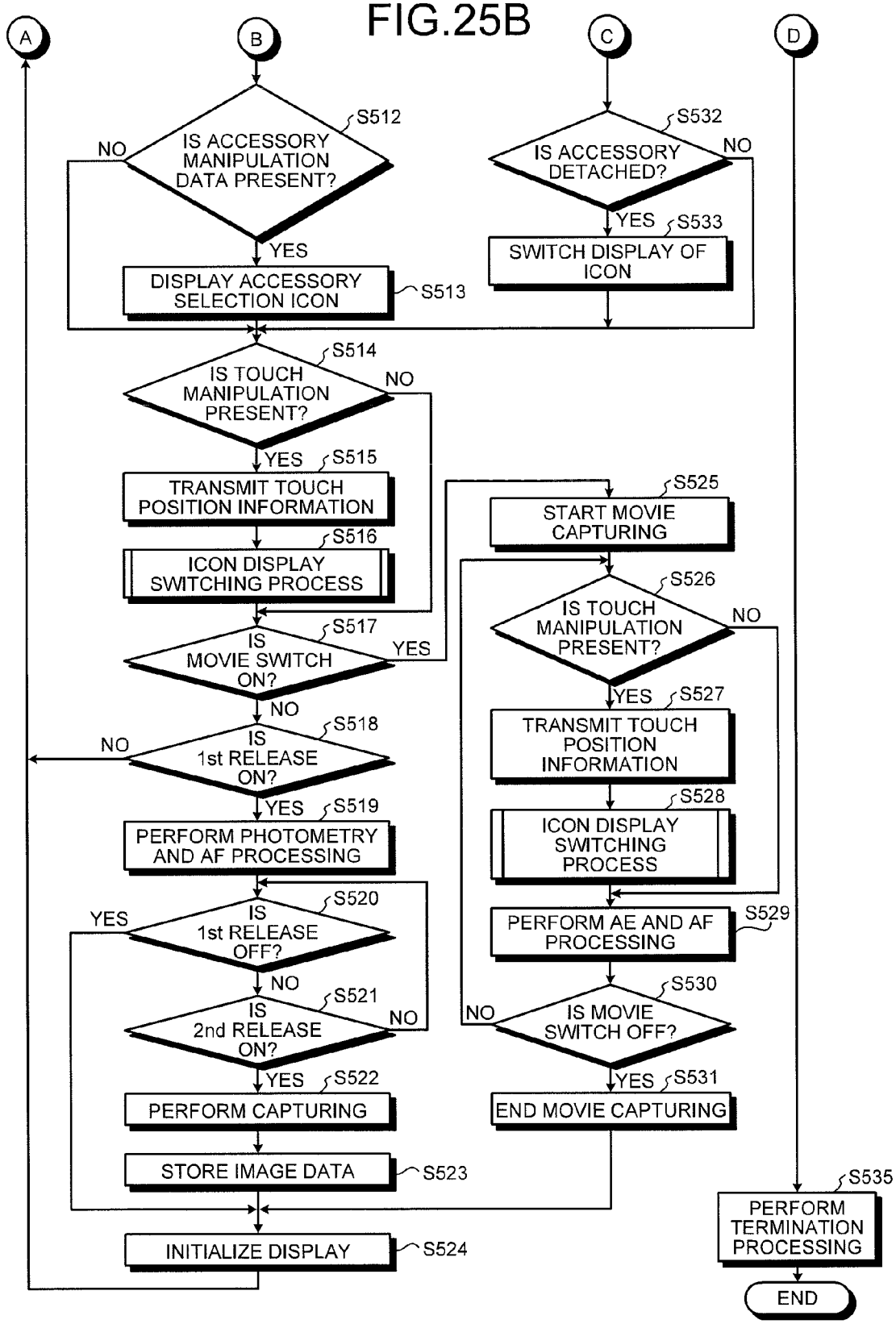

FIG.31
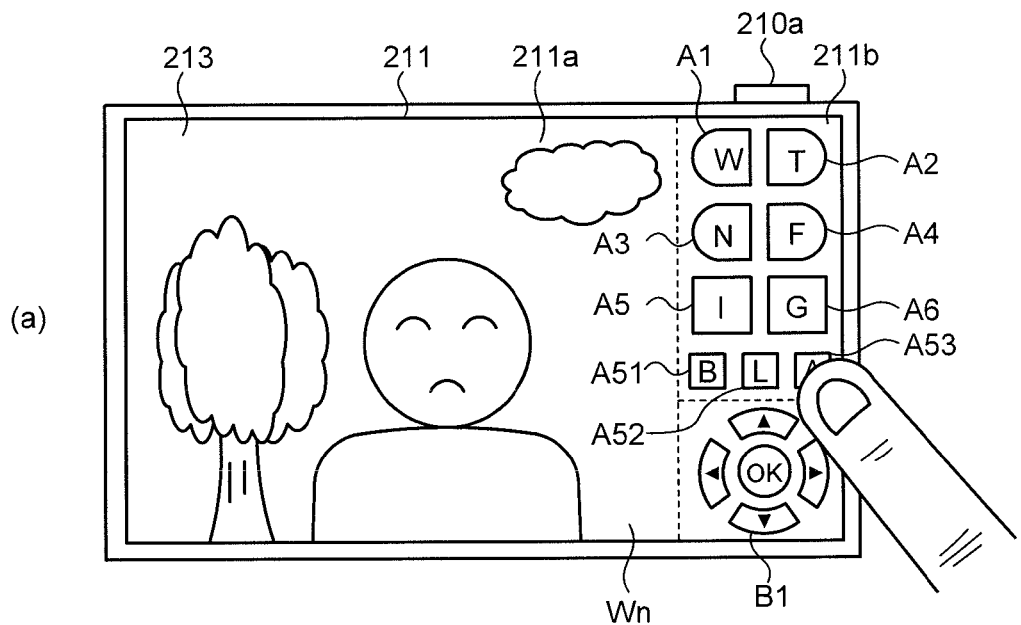
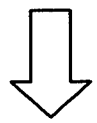
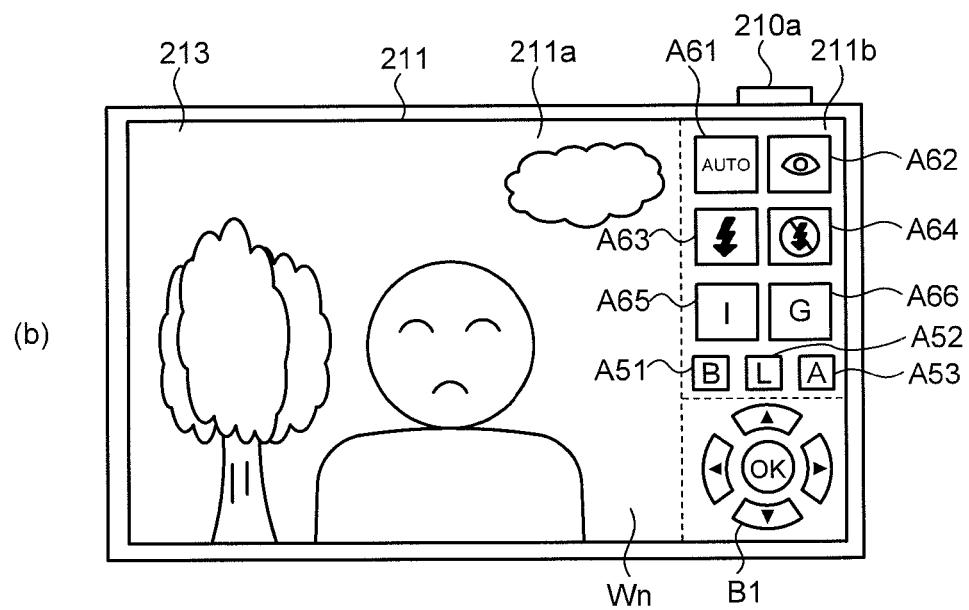

FIG.34

| MANIPULATION TYPE | ICON DISPLAY POSITION | ICON DISPLAY SIZE | ICON IMAGE | ATTRI-BUTE | MANIPULATION CORRESPONDENCE IMAGE DATA |
|---|---|---|---|---|---|
| WIDE ANGLE-SIDE ZOOM DRIVING | (10, 15) | 30 × 30 | IMAGE DATA 1 (W-ICON) | 01 | COMMAND INFORMATION 1 (DRIVING COMMAND, STOP COMMAND) |
| TELE-SIDE ZOOM DRIVING | (60, 15) | 30 × 30 | IMAGE DATA 2 (T-ICON) | 01 | COMMAND INFORMATION 2 (DRIVING COMMAND, STOP COMMAND) |
| NEAR-SIDE FOCUS DRIVING | (10, 65) | 30 × 30 | IMAGE DATA 3 (N-ICON) | 01 | COMMAND INFORMATION 3 (DRIVING COMMAND, STOP COMMAND) |
| FAR-SIDE FOCUS DRIVING | (60, 65) | 30 × 30 | IMAGE DATA 4 (F-ICON) | 01 | COMMAND INFORMATION 4 (DRIVING COMMAND, STOP COMMAND) |
| LENS INFORMATION DISPLAY | (10, 115) | 30 × 30 | IMAGE DATA 5 (I-ICON) | 00 | LENS INFORMATION IMAGE DATA |
| MANIPULATION GUIDE DISPLAY | (60, 115) | 30 × 30 | IMAGE DATA 6 (G-ICON) | 00 | MANIPULATION GUIDE IMAGE DATA |

T4

EXTERNAL EQUIPMENT STORING
MANIPULATION INFORMATION AND
OPERATION INFORMATION AND CAMERA
SYSTEM USING SUCH INFORMATION

CROSS-REFERENCE TO RELATED APPLICATIONS

This application is based upon and claims the benefit of priority from Japanese Patent Application No. 2011-156600, filed on Jul. 15, 2011, the entire contents of which are incorporated herein by reference.

BACKGROUND OF THE INVENTION

1. Field of the Invention

The present invention relates to external equipment including a replacement lens device and an external strobe device which are detachable from a body of a digital single-lens reflex camera, a camera system, an imaging method, and a computer-readable recording medium.

2. Description of the Related Art

In recent years, progress in the techniques of video equipment is noticeable. In particular, in the field of imaging apparatuses such as digital cameras, capturing functions have increased every year in response to the demands of users. In line with this, external equipment including accessories such as a replacement lens or an external strobe, which is detachable from a camera body of an imaging apparatus, has been released successively.

For example, Japanese Laid-open Patent Publication No. 2010-181725 discloses a camera system in which when a replacement lens device is attached to the body of an imaging apparatus, lens information such as a model name, an overview diagram, and a lens structural image is acquired from the replacement lens device attached to the camera body and is displayed on a display monitor.

SUMMARY OF THE INVENTION

External equipment according to an aspect of the present invention constitutes a part of a camera system and is detachable from a body portion of the camera system, the external equipment including: a communication unit that communicates with the body portion; a storage unit that stores manipulation information including manipulation image data corresponding to a manipulation type of the camera system and operation information related to an operation of the camera system corresponding to the manipulation type; and a control unit that transmits the manipulation information and the operation information to the body portion when the external equipment is attached to the body portion, causes the camera system to display the manipulation image data on a display unit based on the manipulation information, performs control so that the camera system performs an operation based on the operation information, and performs control so that the manipulation image data is removed from the display unit when the external equipment is detached from the body portion.

A camera system according to another aspect of the present invention includes a body portion and external equipment that is detachable from the body portion, wherein the external equipment includes: a body communication unit that communicates with the body portion; and a storage unit that stores manipulation information including manipulation image data corresponding to a manipulation type of the camera system and operation information related to an operation of the camera system corresponding to the manipulation type, and wherein the body portion includes: an imaging unit that images a subject image; an external equipment communication unit that communicates with the external equipment; a display unit that displays information related to the external equipment; and a control unit that receives the manipulation information and the operation information from the external equipment when the external equipment is attached to the body portion, causes the display unit to display the manipulation image data based on the manipulation information, performs control so that the camera system performs an operation based on the operation information, and performs control so that the manipulation image data is removed from the display unit when the external equipment is detached from the body portion.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a lens driving data table as lens driving data stored in a lens driving data storage unit according to the first embodiment of the present invention;

FIG. 10 is a diagram illustrating an example of a lens manipulation data table as lens manipulation data stored in a lens manipulation data storage unit according to a second embodiment of the present invention;

FIGS. 25A and 25B are flowcharts illustrating an overview of the process performed by a control unit of the camera system according to the third embodiment of the present invention;

FIG. 31 is a diagram illustrating another example of a screen transition of icons which the control unit displays in the icon manipulation region of the display unit;

FIG. 34 is a diagram illustrating an example of a lens manipulation data table as lens manipulation data stored in a lens manipulation data storage unit according to a fourth embodiment of the present invention;

DETAILED DESCRIPTION OF THE PREFERRED EMBODIMENTS

Figure 1:
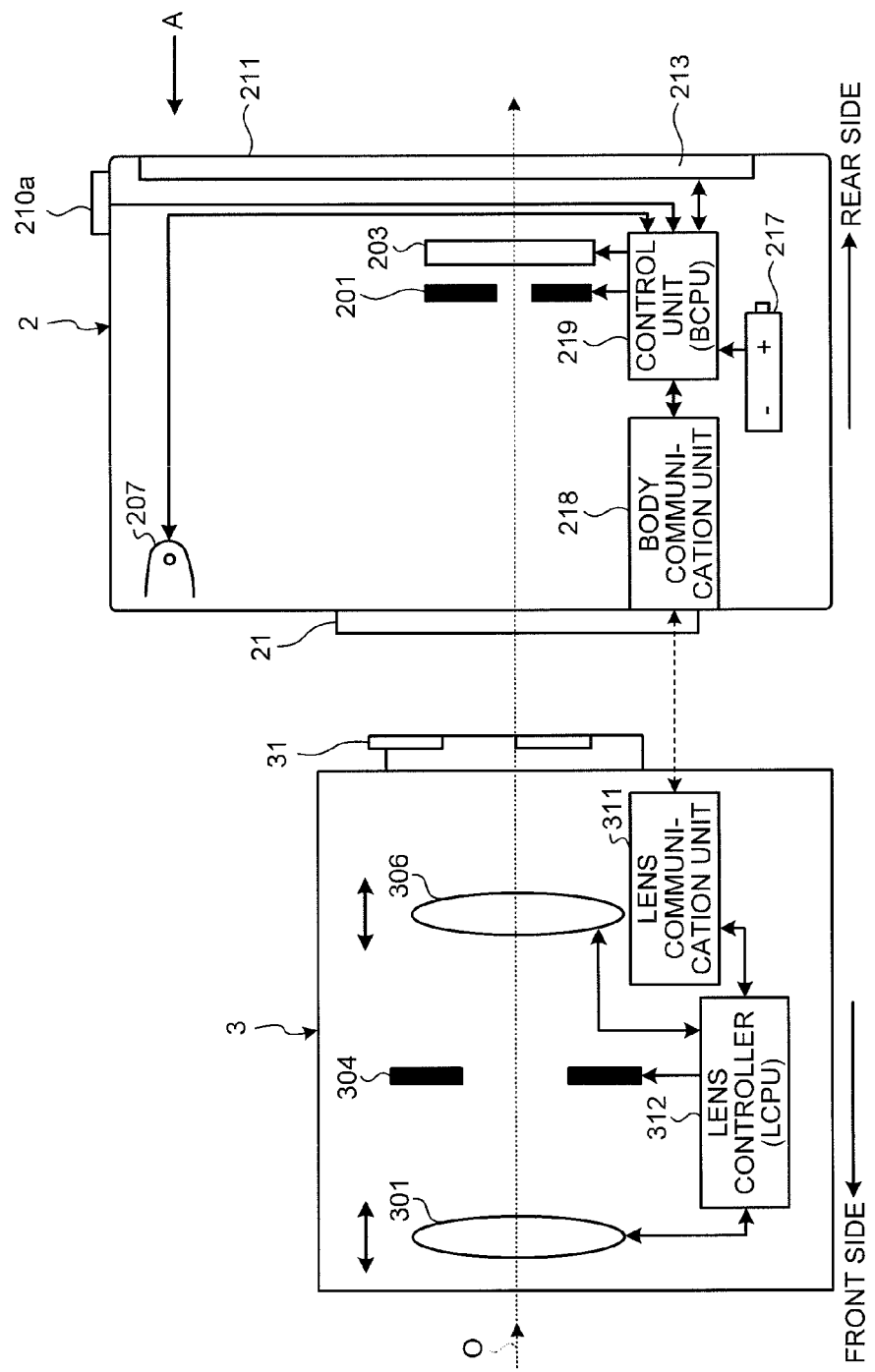
FIG. 1 is a schematic configuration diagram of a camera system to which a replacement lens device according to a first embodiment of the present invention is attached.

Hereinafter, embodiments for carrying out the present invention (hereinafter, referred to as "embodiments") will be described with reference to the drawings. The present invention is not limited to the embodiments. In the drawings, the same portions will be denoted by same reference numerals.

First Embodiment

Figure 2:
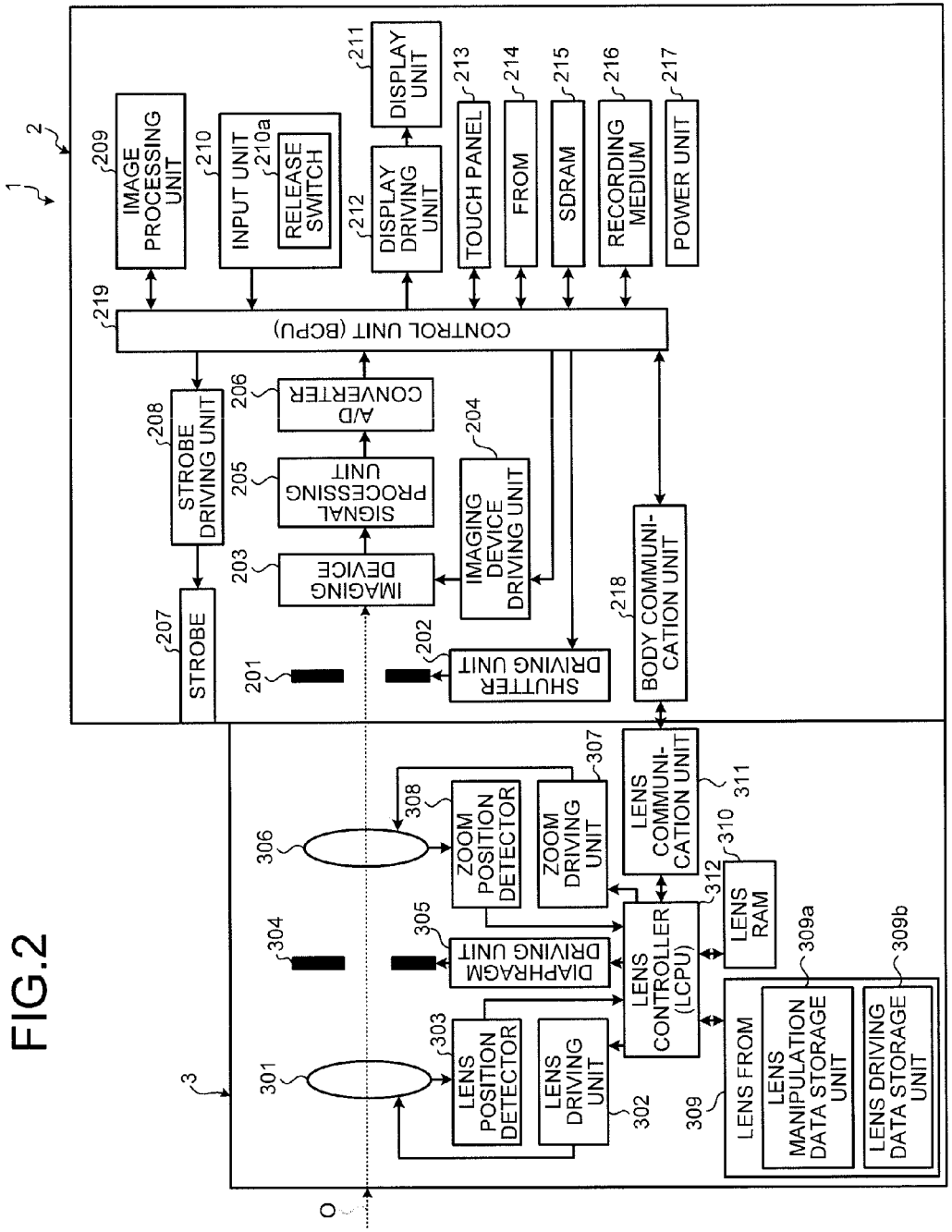
FIG. 2 is a block diagram illustrating a configuration of a camera system to which the replacement lens device according to the first embodiment of the present invention is attached.

FIG. 1 is a schematic configuration diagram of a camera system to which a replacement lens device according to a first embodiment of the present invention is attached. FIG. 2 is a block diagram illustrating a configuration of a camera system to which the replacement lens device according to the first embodiment of the present invention is attached. In FIGS. 1 and 2, the left and right sides will be described as front and rear sides, respectively.

A camera system 1 illustrated in FIGS. 1 and 2 includes a body portion 2 and a replacement lens device 3 that is attachable to the body portion 2. The replacement lens device 3 is attached to the body portion 2 by connecting a rear-side lens mount 31 formed on the rear side of the replacement lens device 3 to a body-side mount ring 21 formed on the front side of the body portion 2. In this way, the body portion 2 and the replacement lens device 3 are integrally connected. The body-side mount ring 21 may be a bayonet-type, for example.

The body portion 2 includes a shutter 201, a shutter driving unit 202, an imaging device 203, an imaging device driving unit 204, a signal processing unit 205, an A/D converter 206, a strobe 207, a strobe driving unit 208, an image processing unit 209, an input unit 210, a display unit 211, a display driving unit 212, a touch panel 213, an FROM 214, an SDRAM 215, a recording medium 216, a power unit 217, a body communication unit 218, and a control unit 219 (hereinafter referred to as a "BCPU" 219).

The shutter 201 performs an opening/closing operation to perform an exposure operation so that an exposed state or a light-blocking state is created in the imaging device 203. The shutter 201 is configured using a focal-plane shutter or the like. The shutter driving unit 202 is configured using a step motor or the like and drives the shutter 201 in accordance with an instruction signal input from the BCPU 219.

The imaging device 203 is configured using a CCD (charge coupled device) or a CMOS (complementary metal oxide semiconductor) that receives light collected by the replacement lens device 3 to perform photoelectric conversion. The imaging device driving unit 204 outputs image data (analog signal) received from the imaging device 203 to the signal processing unit 205 at a predetermined imaging timing.

The signal processing unit 205 performs analog signal processing on the image data input from the imaging device 203 and outputs the processed image data to the A/D converter 206. Specifically, the signal processing unit 205 performs noise-reduction processing, gain-up processing, and the like to the image data.

The A/D converter 206 performs A/D conversion on the image data input from the signal processing unit 205 to generate digital image data (RAW data) and outputs the digital image data to the BCPU 219.

The strobe 207 is configured using a xenon lamp, an LED, or the like. The strobe 207 emits light toward a predetermined view-field region in synchronization with the exposure operation of the shutter 201. The strobe driving unit 208 causes the strobe 207 to emit light under the control of the BCPU 219.

The image processing unit 209 performs various types of image processing on the image data. Specifically, the image processing unit 209 performs image processing on the image data, including optical black subtraction, white balance adjustment, image data synchronization, color matrix computation, γ-correction, color reproduction, edge enhancement, and the like. The image processing unit 209 performs a process of extracting high-frequency components (contrast) from the image data in a focus detection region by high-pass filtering to thereby calculate an AF evaluation value. The image processing unit 209 may compress the image data in accordance with a predetermined format, for example, a JPEG (joint photographic experts group) format, a motion JPEG format, an MP4 (H.264) format, and the like and record the compressed image data in the recording medium 216.

The input unit 210 includes a power switch (not illustrated) that switches the power state of the camera system 1 to ON or OFF state, a release switch 210a that receives the input of a still-image release signal that instructs capturing of still-images, a shooting mode changeover switch (not illustrated) that switches between various shooting modes set in the camera system 1, and a movie switch (not illustrated) that receives the input of a movie release signal that instructs capturing of movies. The release switch 210a is configured to be advanced and retracted by pressing, and receives the input of a first release signal that instructs a capturing preparation operation when it is half-pressed and also receives the input of a second release signal that instructs capturing of still-images when it is full-pressed.

The display unit 211 is configured using a liquid crystal display panel, an organic EL (electro luminescence) display panel, or the like. The display driving unit 212 displays captured image data and various types of capturing information on the display unit 211.

Figures 3, 4:
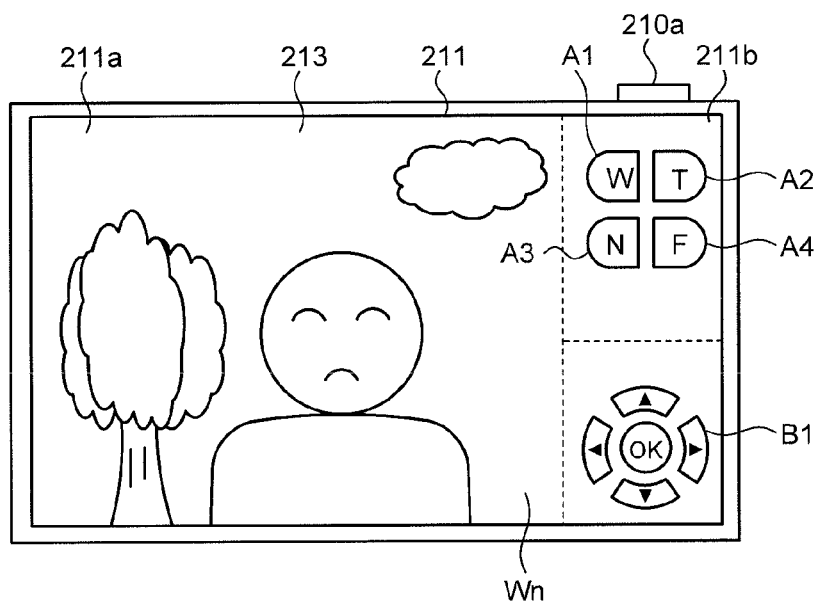
FIG. 3 is a rear view of the camera system seen from the direction indicated by arrow A in FIG. 1.
FIG. 4 is a diagram illustrating an example of a lens manipulation data table as lens manipulation data stored in a lens manipulation data storage unit according to the first embodiment of the present invention.

Here, a display region in which the display unit 211 displays images will be described. FIG. 3 is a rear view of the camera system 1 seen from the direction indicated by arrow A in FIG. 1. As illustrated in FIG. 3, the display unit 211 includes an image display region 211a for displaying an image Wn (n=natural number) corresponding to image data and an icon manipulation region 211b for displaying manipulation icons for various capturing manipulations. The display unit 211 displays a wide angle-side zoom icon A1 (hereinafter referred to as a "W-icon A1"), a tele-side zoom icon A2 (hereinafter referred to as a "T-icon A2"), a near-side focus icon A3 (hereinafter referred to as an "N-icon A3"), a far-side focus icon A4 (hereinafter referred to as an "F-icon A4"), and a menu manipulation icon B1 (hereinafter referred to as a "M-icon B1") in the icon manipulation region 211b as manipulation icons. The respective icons illustrated in FIG. 3 will be described later.

The touch panel 213 is provided on the display screen of the display unit 211 (see FIG. 3). The touch panel 213 detects a touch (contact) position which the photographer touches in accordance with the manipulation icons displayed by the display unit 211 and outputs a signal corresponding to the detected touch position to the BCPU 219. In general, the touch panel comes in various types such as a resistive type, a capacitive type, or an optical type. Any type of touch panel is applicable to the first embodiment.

The FROM 214 is configured using nonvolatile memory. The FROM 214 stores various programs for operating the camera system 1, various data used during execution of programs, various parameters necessary for the image processing operations by the image processing unit 209, and the like.

The SDRAM 215 is configured using volatile memory. The SDRAM 215 temporarily stores information under the processing of the BCPU 219.

The recording medium 216 is configured using a memory card or the like attached from the outside of the body portion 2. The recording medium 216 is removably attached to the body portion 2 via a memory I/F (not illustrated). The recording medium 216 records image data thereon and the recorded image data is read from the recording medium 216.

The power unit 217 supplies power to the body portion 2 and the respective units constituting the replacement lens device 3. The power unit 217 performs operations such as smoothing and boosting on the voltage of a battery included in the body portion 2 and supplies power to the respective units.

The body communication unit 218 is a communication interface for performing communication with the replacement lens device 3 attached to the body portion 2.

The BCPU 219 is configured using a CPU (central processing unit) or the like. The BCPU 219 transmits corresponding instructions and data to the respective units constituting the camera system 1 in accordance with an instruction signal from the input unit 210 to thereby control the operation of the camera system 1 in an integrated manner.

The replacement lens device 3 includes a focus lens 301, a lens driving unit 302, a lens position detector 303, a diaphragm 304, a diaphragm driving unit 305, a zoom lens 306, a zoom lens driving unit 307, a zoom position detector 308, a lens FROM 309, a lens RAM 310, a lens communication unit 311, and a lens controller 312 (hereinafter referred to as an "LCPU 312").

The focus lens 301 adjusts the focus state of the replacement lens device 3 by being driven along the direction of optical axis O. The focus lens 301 is configured using one or multiple lenses. The lens driving unit 302 moves the focus lens 301 along the direction of optical axis O. The lens driving unit 302 is configured using a driving motor such as a step motor or a voice coil motor, a motor drive, and the like.

The lens position detector 303 is configured using a photo-interrupter or the like, and detects the position of the focus lens 301 driven by the lens driving unit 302. Specifically, the lens position detector 303 converts the amount of rotation of a driving motor included in the lens driving unit 302 into a pulse count and detects the position of the focus lens 301 from a reference position, which is in accordance with an infinite end, based on the converted pulse count.

The diaphragm 304 adjusts the amount of subject light entering the body portion 2 by changing its aperture size. Specifically, the diaphragm 304 adjusts the exposure by limiting the amount of incident light collected by the replacement lens device 3. The diaphragm driving unit 305 performs an opening operation of the diaphragm 304 by driving the diaphragm 304. The diaphragm driving unit 305 is configured using a step motor, a motor driver, or the like.

The zoom lens 306 changes the focal distance of the replacement lens device 3 by being driven along the direction of optical axis O. The zoom lens 306 is configured using one or multiple lenses. The zoom lens driving unit 307 moves the zoom lens 306 along the direction of optical axis O. The zoom lens driving unit 307 is configured using a driving motor such as a step motor or a voice coil motor, a motor driver, and the like.

The zoom position detector 308 detects the position of the zoom lens 306 driven by the zoom lens driving unit 307. The zoom position detector 308 is configured using a linear encoder, a potentiometer such as a variable resistance element, an A/D conversion circuit, and the like.

The lens FROM 309 is configured using nonvolatile memory, and stores control programs for determining the position and the movement of the focus lens 301 and the zoom lens 306 and optical data including the lens properties and various parameters of each of the focus lens 301 and the zoom lens 306. The lens FROM 309 includes a lens manipulation data storage unit 309*a* and a lens driving data storage unit 309*b*. The lens manipulation data storage unit 309*a* stores lens manipulation icon image data corresponding to each of the manipulation types of each of the focus lens 301 and the zoom lens 306 and lens manipulation data as manipulation information including a display region in which the display unit 211 displays the lens manipulation icon image data. The lens driving data storage unit 309*b* stores operation information regarding the operation of the replacement lens device 3 corresponding to each of the manipulation types of the replacement lens device 3. Specifically, the lens driving data storage unit 309*b* stores lens driving data as operation information for driving each of the focus lens 301 and the zoom lens 306, corresponding to each of the manipulation types of the replacement lens device 3.

Here, the lens manipulation data and the lens driving data stored in the lens manipulation data storage unit 309*a* and the lens driving data storage unit 309*b*, respectively, will be described. FIG. 4 is a diagram illustrating an example of a lens manipulation data table as the lens manipulation data stored in the lens manipulation data storage unit 309*a*. FIG. 5 is a diagram illustrating an example of a lens driving data table as the lens driving data stored in the lens driving data storage unit 309*b*.

As illustrated in FIG. 4, a manipulation type, an icon display position, an icon display size, and an icon image are described in the lens manipulation data table T1. For example, an icon display position of (10,15), an icon display size of 30×30, and an icon image of image data 1 are described for a manipulation type of wide angle-side zoom driving. Moreover, an icon display position of (10,65), an icon display size of 30×30, and an icon image of image data 3 are described for a manipulation type of near-side focus driving.

Moreover, as illustrated in FIG. 5, a manipulation type and manipulation correspondence data are described in the lens driving data table T2. For example, manipulation correspondence data of command information 1 is described for a manipulation type of wide angle-side zoom driving. Moreover, manipulation correspondence data of command information 3 is described for a manipulation type of near-side focus driving.

As above, the lens manipulation data storage unit 309*a* and the lens driving data storage unit 309*b* store manipulation information and driving information unique to the replacement lens device 3.

The lens RAM 310 is configured using volatile memory and temporarily stores information under the processing of the LCPU 312.

The lens communication unit 311 is a communication interface for performing communication with the body communication unit 218 of the body portion 2 when the replacement lens device 3 is attached to the body portion 2. Moreover, power is supplied from the power unit 217 of the body portion 2 to the respective units of the replacement lens device 3 via the lens communication unit 311 and the body communication unit 218.

The LCPU 312 is configured using a CPU or the like and controls the operations of the respective units of the replacement lens device 3. Specifically, the LCPU 312 controls the driving of the lens driving unit 302, the diaphragm driving unit 305, and the zoom lens driving unit 307. The LCPU 312 performs control of transmitting the manipulation information stored in the lens manipulation data storage unit 309*a* to the body portion 2 so that a manipulation image corresponding to manipulation image data is displayed on the display unit 211 when the replacement lens device 3 is manipulated by the body portion 2. Moreover, the LCPU 312 controls the driving of the replacement lens device 3 based on operation information determined by touch position information and manipulation information when a manipulation image is displayed on the display unit 211, and the touch position information is received from the body portion 2. Specifically, the LCPU 312 communicates with the BCPU 219 via the lens communication unit 311 and the body communication unit 218 and transmits lens data including a lens operation state of the replacement lens device 3, and the optical data and the lens manipulation data stored in the lens FROM 309 so that a manipulation icon corresponding to the lens manipulation data is displayed on the display unit 211. Furthermore, the LCPU 312 drives the focus lens 301 or the zoom lens 306 based on driving data determined by touch position information and the lens manipulation data when the touch position information detected by the touch panel 213 is received from the body portion 2.

Figure 6A:
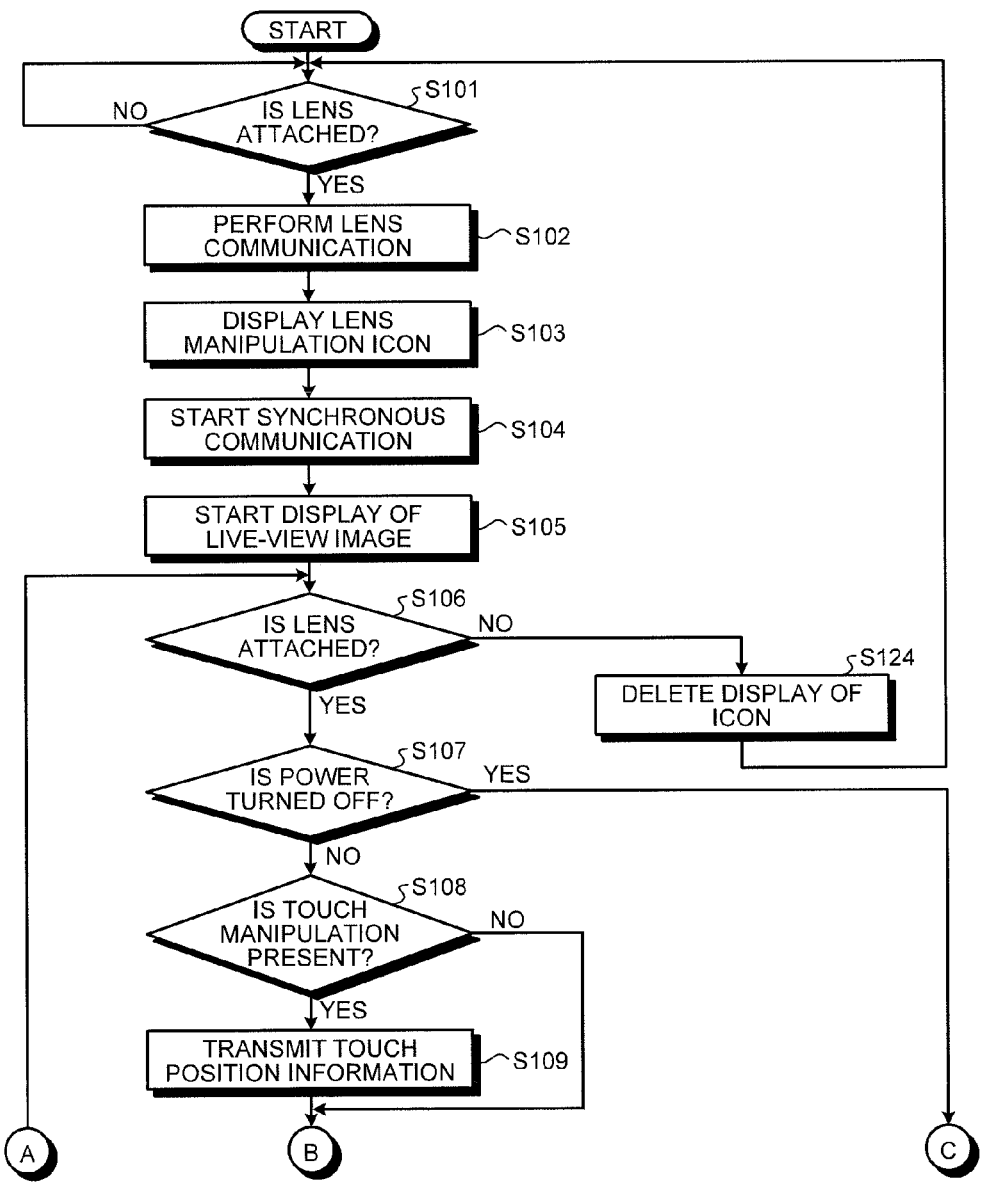
FIGS. 6A and 6B are flowcharts illustrating an overview of the process performed by a control unit of the camera system according to the first embodiment of the present invention.
Figure 6B:
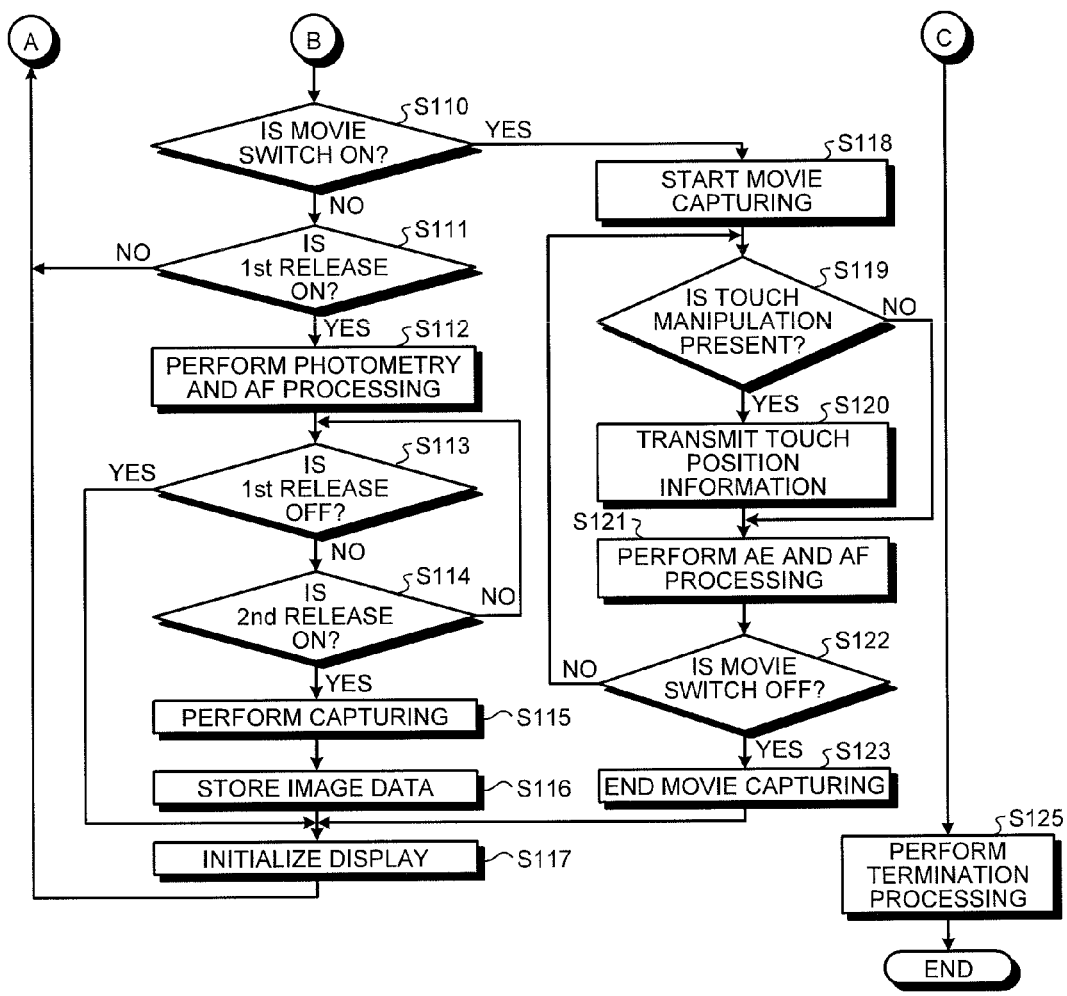

Next, the operation of the BCPU 219 of the camera system 1 according to the first embodiment will be described. FIGS. 6A and 6B are flowcharts illustrating an overview of the process performed by the BCPU 219.

As illustrated in FIGS. 6A and 6B, first, when the body portion 2 is powered on, the BCPU 219 determines whether or not the replacement lens device 3 is attached (step S101). When the BCPU 219 determines that the replacement lens device 3 is not attached to the body portion 2 (No in step S101), the BCPU 219 performs a standby operation to periodically detect the attachment until the replacement lens device 3 is attached. When a photographer performs manipulations of changing capturing parameters and reproducing image data captured in the past during the standby state, the BCPU 219 executes operations corresponding to the respective manipulations.

In contrast, when the BCPU 219 determines that the replacement lens device 3 is attached to the body portion 2 (Yes in step S101), the BCPU 219 performs lens communication with the LCPU 312 via the body communication unit 218 and the lens communication unit 311 (step S102). Specifically, the BCPU 219 acquires lens data including the optical data and the lens manipulation data of the replacement lens device 3 and stores the lens data in the SDRAM 215.

Subsequently, the BCPU 219 displays lens manipulation icons in the icon manipulation region 211*b* of the display unit 211 based on the lens manipulation data of the replacement lens device 3 acquired from the LCPU 312 (step S103). Specifically, the BCPU 219 displays manipulation icons in the icon manipulation region 211*b* of the display unit 211 based on the lens manipulation data.

Figure 7:
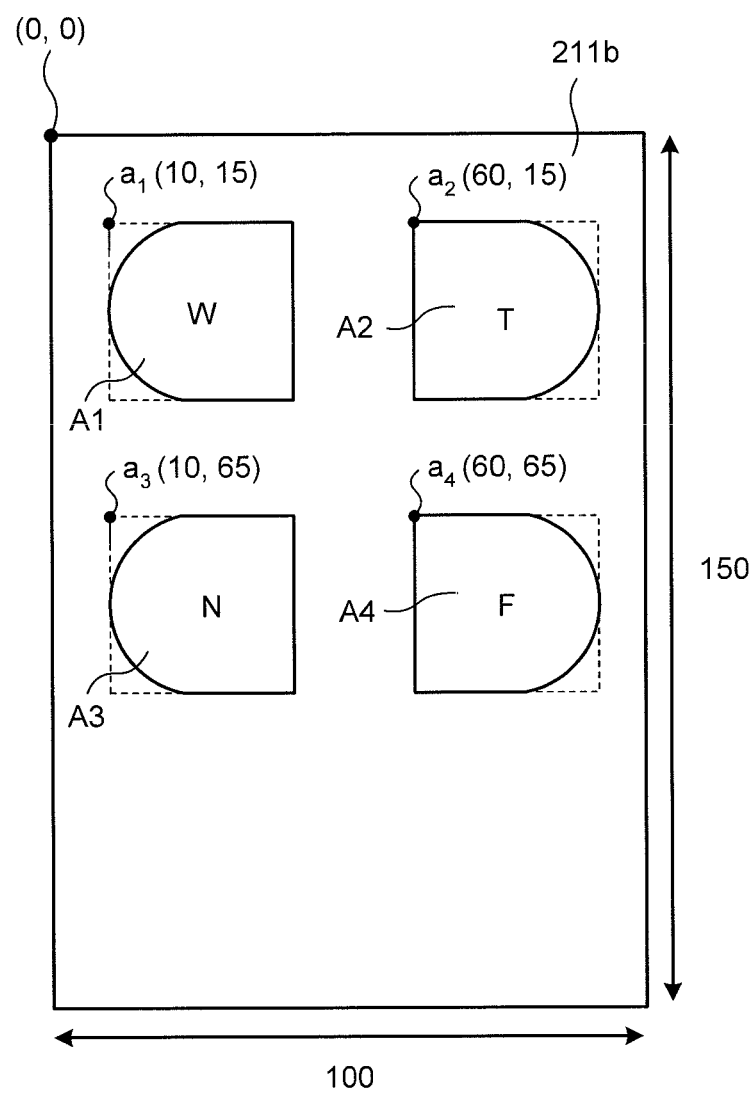
FIG. 7 is a diagram illustrating an example of a display position at which the control unit displays manipulation icons in an icon manipulation region of the display unit.

FIG. 7 is a diagram illustrating an example of a display position of a manipulation icon which the BCPU 219 displays in the icon manipulation region 211*b* of the display unit 211.

In FIG. 7, a coordinate system is defined such that the top left corner of the icon manipulation region 211b is the origin, the rightward direction is the positive direction of the X axis, and the downward direction is the positive direction of the Y axis. In FIG. 7, the icon manipulation region 211b is a region having a resolution of 100×150 dots.

As illustrated in FIG. 7, the BCPU 219 determines the display position of each manipulation icon based on icon display position information data and an icon display size included in the lens manipulation data. Specifically, as illustrated in FIG. 7, the BCPU 219 displays a wide angle-side zoom icon A1, a tele-side zoom icon A2, a near-side MF-icon A3, and a far-side MF-icon A4 at respective display positions ($a_1$ to $a_4$) of the icon manipulation region 211b of the display unit 211, respectively. As above, the BCPU 219 determines the display positions of the respective manipulation icons based on the icon display position data and the icon display size included in the lens manipulation data and displays the respective icons in the icon manipulation region 211b of the display unit 211. In this way, the user can immediately perform capturing manipulations on the camera system 1 by touching the icons displayed in the icon manipulation region 211b.

Returning to FIGS. 6A and 6B, description following step S104 will be continued. In step S104, the BCPU 219 starts synchronous communication with the LCPU 312 via the body communication unit 218 and the lens communication unit 311.

Subsequently, the BCPU 219 operates the imaging device 203 every synchronous communication by driving the imaging device driving unit 204 to acquire image data, performs image processing for displaying live-view images on the acquired image data with the aid of the image processing unit 209, and displays live-view images on the display unit 211 (step S105).

Figure 8:
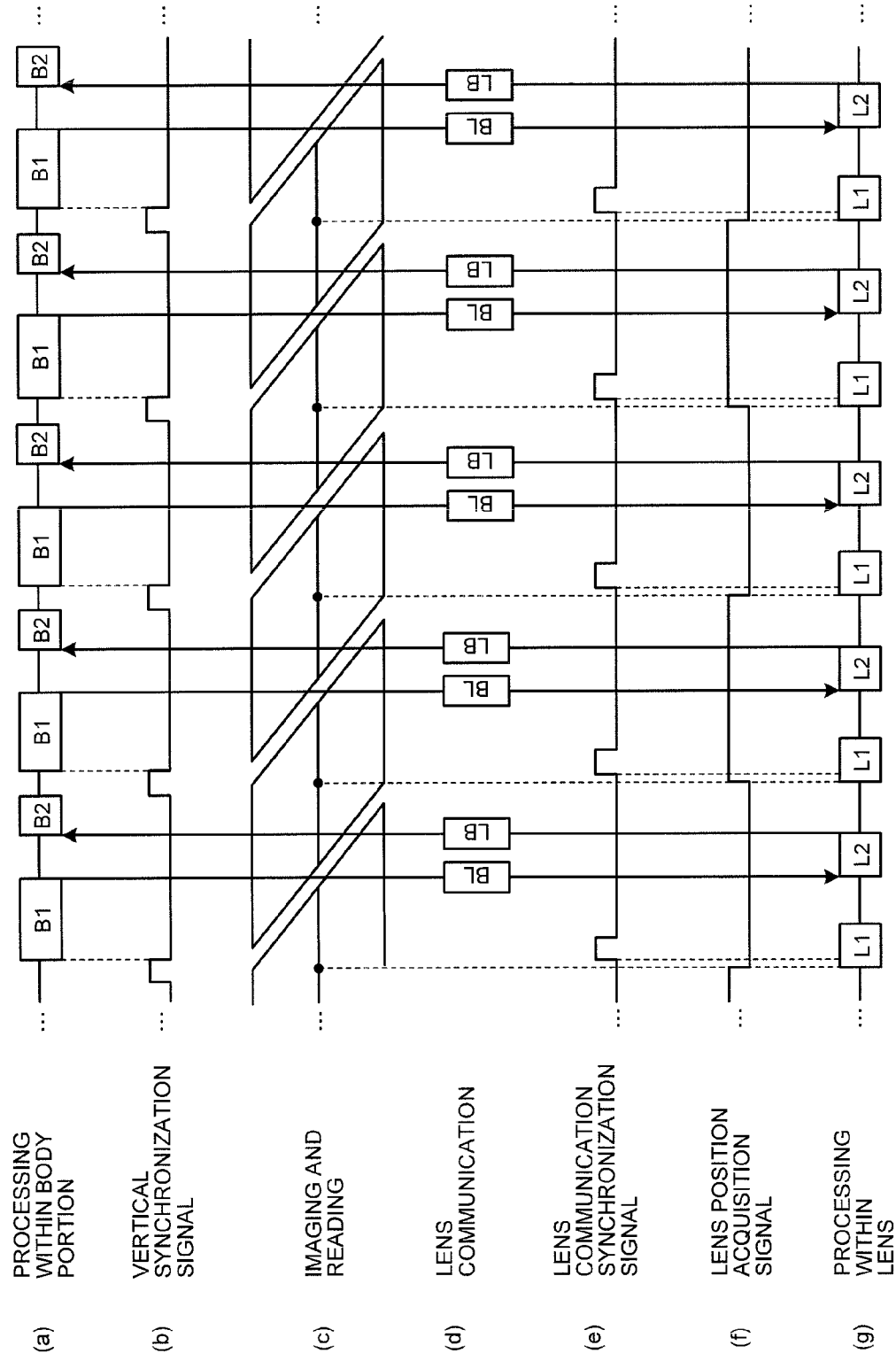
FIG. 8 is a timing chart illustrating an example of synchronous communication between the control unit and a lens controller of the replacement lens device.

Here, synchronous communication will be described. FIG. 8 is a timing chart illustrating an example of synchronous communication between the BCPU 219 and the LCPU 312. In FIG. 8, FIG. 8(a) illustrates the timing of processing within the body portion, FIG. 8(b) illustrates a vertical synchronization signal, FIG. 8(c) illustrates the timing of imaging and reading, FIG. 8(d) illustrates the content of lens communication, FIG. 8(e) illustrates the timing of a lens communication synchronization signal, FIG. 8(f) illustrates the timing of a lens position acquisition signal, and FIG. 8(g) illustrates the timing of processing within the lens of the replacement lens device 3.

As illustrated in FIG. 8, the BCPU 219 transmits a lens status data request command for acquiring lens status data to the LCPU 312 via the body communication unit 218 and the lens communication unit 311 (BL). Moreover, the BCPU 219 transmits a lens communication synchronization signal and a lens position acquisition signal instructing the timing of acquiring the position information of the focus lens 301 in addition to the lens status data request command in a predetermined period, for example, the same period as a vertical synchronization signal, during the synchronous communication mode. The state of the lens position acquisition signal changes at a predetermined timing, for example, at a point in time at which half of the storage time of the central portion of the imaging device 203 has elapsed as illustrated in FIG. 8(c). Thus, the LCPU 312 acquires the position information of the focus lens 301 and the zoom lens 306 at the timing at which the lens position acquisition signal is changed. After that, the LCPU 312 transmits lens status data to the BCPU 219 based on the lens status data request command received via the body communication unit 218 and the lens communication unit 311 (LB).

Specifically, the BCPU 219 causes the image processing unit 209 to execute image processing on the live-view image, calculation of an AF evaluation value, and the like based on the image data acquired in the previous frame and transmits the lens status data request command to the LCPU 312 (B1). Subsequently, the BCPU 219 calculates the AF evaluation value and changes various settings, for example, an exposure value based on the acquired lens status data (B2). The LCPU 312 acquires lens position information of the focus lens 301 and the zoom lens 306 at the timing when the state of the lens position acquisition signal changes and detects a manipulation state of an MF ring (not illustrated) at the timing when the lens communication synchronization signal is received (L1). Subsequently, the LCPU 312 transmits lens status data including the position information of the focus lens 301 and the zoom lens 306 and the manipulation state of the MF ring to the BCPU 219 based on the lens status data request command received from the BCPU 219 (L2).

Returning to FIG. 6A, the description following step S106 is continued. In step S106, the BCPU 219 determines whether the replacement lens device 3 is attached to the body portion 2 or not. Specifically, when it was possible to acquire the lens status data by synchronous communication, the BCPU 219 determines that the replacement lens device 3 is attached to the body portion 2. On the other hand, when it was not possible to acquire the lens status data by synchronous communication, the BCPU 219 determines that the replacement lens device 3 is not attached to the body portion 2. When the BCPU 219 determines that the replacement lens device 3 is attached to the body portion 2 (Yes in step S106), the BCPU 219 proceeds to step S107 described later. On the other hand, when the BCPU 219 determines that the replacement lens device 3 is not attached to the body portion 2 (No in step S106), the BCPU 219 proceeds to step S124 described later.

In step S107, the BCPU 219 determines whether power is in the OFF state. When the BCPU 219 determines that the power is in the OFF state (Yes in step S107), the BCPU 219 proceeds to step S125 described later. On the other hand, when the BCPU 219 determines that the power is not in the OFF state (No in step S107), the BCPU 219 proceeds to step S108 described later.

In step S108, the BCPU 219 determines whether a touch manipulation is performed on the touch panel 213. When the BCPU 219 determines that a touch manipulation is performed on the touch panel 213 (Yes in step S108), the BCPU 219 transmits the touch position information representing a touch position output from the touch panel 213 to the LCPU 312 via the body communication unit 218 and the lens communication unit 311 (step S109), and proceeds to step S110. On the other hand, when the BCPU 219 determines that a touch manipulation is not performed on the touch panel 213 (No in step S108), the BCPU 219 proceeds to step S110.

Subsequently, when the movie switch is not in the ON state (No in step S110), and a first release signal (1st) is input (Yes in step S111), the BCPU 219 executes photometry and AF processing for capturing still-images while performing synchronous communication with the LCPU 312 (step S112). Specifically, the BCPU 219 performs photometry processing which involves exposure computation of calculating a luminance value and a luminance distribution within an image based on the image data output from the imaging device 203 via the signal processing unit 205 and the A/D converter 206. Furthermore, the BCPU 219 executes a so-called mountain-climbing AF operation in which a position where the high-frequency components extracted from image data become the largest is selected as a focus position. The BCPU 219 may perform a phase-difference AF operation in which the driving of the focus lens 301 is controlled based on a defocus amount calculated from a phase difference of the outputs of multiple pairs of AF pixels receiving subject beams passing through pupil positions different from the replacement lens device 3, provided in the imaging device 203.

After that, when the first release signal is input (No in step S113), and the release switch 210a is full-pressed so that a second release signal (2nd) is input (Yes in step S114), the BCPU 219 performs capturing (step S115). Specifically, the BCPU 219 performs communication with the LCPU 312 and transmits a command regarding the operation of the diaphragm 304 based on the result of the exposure computation calculated by the photometry processing. Moreover, after receiving diaphragm operation completion information transmitted from the LCPU 312, the BCPU 219 causes the imaging device driving unit 204 and the shutter driving unit 202 to drive the imaging device 203 and the shutter 201 and performs capturing. Finally, the BCPU 219 causes the image processing unit 209 to execute image processing on the image data output from the imaging device 203 via the signal processing unit 205 and the A/D converter 206.

Subsequently, the BCPU 219 stores the captured image data in the SDRAM 215 or the recording medium 216 (step S116). In this case, the BCPU 219 drives the display driving unit 212 so that a still-image (captured image) corresponding to the captured image data is displayed on the display unit 211 as a rec-view image for a predetermined period (for example, 2 seconds).

After that, the BCPU 219 deletes the still-image displayed on the display unit 211 as a rec-view image, initializes a focus mark, and initializes the display of the live-view image on the display unit 211 (step S117) and returns to step S106.

In step S111, when the first release signal is not input via the release switch 210a (No in step S111), the BCPU 219 returns to step S106.

In step S113, when the first release signal is not input (Yes in step S113), the BCPU 219 proceeds to step S117.

In step S114, when the second release signal is not input via the release switch 210a (No in step S114), the BCPU 219 returns to step S113.

Next, a case (Yes in step S110) where the movie switch is in the ON state in step S110 will be described. In this case, the BCPU 219 starts capturing a movie (step S118). Specifically, the BCPU 219 starts driving the imaging device driving unit 204 to operate the imaging device 203 every synchronous communication to continuously generate image data and causing the image processing unit 209 to perform image processing on the image data output from the imaging device 203 via the signal processing unit 205 and the A/D converter 206 so that the processed image data is stored in the SDRAM 215 or the recording medium 216.

Subsequently, the BCPU 219 determines whether a touch manipulation is performed on the touch panel 213 (step S119). When the BCPU 219 determines that a touch manipulation is performed on the touch panel 213 (Yes in step S119), the BCPU 219 transmits the touch position information representing a touch position output from the touch panel 213 to the LCPU 312 via the body communication unit 218 and the lens communication unit 311 (step S120), and proceeds to step S121. On the other hand, when the BCPU 219 determines that a touch manipulation is not performed on the touch panel 213 (No in step S119), the BCPU 219 proceeds to step S121.

After that, the BCPU 219 executes AE and AF processing for capturing movies while performing synchronous communication with the LCPU 312 (step S121). Specifically, the BCPU 219 executes AE and AF processing of adjusting exposure based on the image data output from the imaging device 203 via the signal processing unit 205 and the A/D converter 206 and performs a wobbling operation of finely driving the focus lens 301 along the optical axis O before and after the focus position detected by the AF processing to maintain a focusing state.

Subsequently, the BCPU 219 determines whether the movie switch is in the OFF state (step S121). When the BCPU 219 determines that the movie switch is in the OFF state (Yes in step S121), the BCPU 219 proceeds to step S123. On the other hand, when the BCPU 219 determines that the movie switch is not in the OFF state (No in step S121), the BCPU 219 returns to step S119.

After step S121, the BCPU 219 ends movie capturing by stopping the driving of the imaging device driving unit 204 to stop the operation of the imaging device 203 (step S123) and proceeds to step S117.

A case (No in step S106) where the BCPU 219 determines that the replacement lens device 3 is not attached to the body portion 2 in step S106 will be described. In this case, the BCPU 219 deletes the manipulation icons corresponding to the lens manipulation data acquired from the LCPU 312 from the icon manipulation region 211b of the display unit 211 (step S124) and returns to step S101.

A case (Yes in step S107) where the power of the body portion 2 is in the OFF state in step S107 will be described. In this case, the BCPU 219 execute predetermined termination processing such as saving various types of data, a reset operation, and disconnecting a power system (step S125), and ends this processing.

Figure 9:
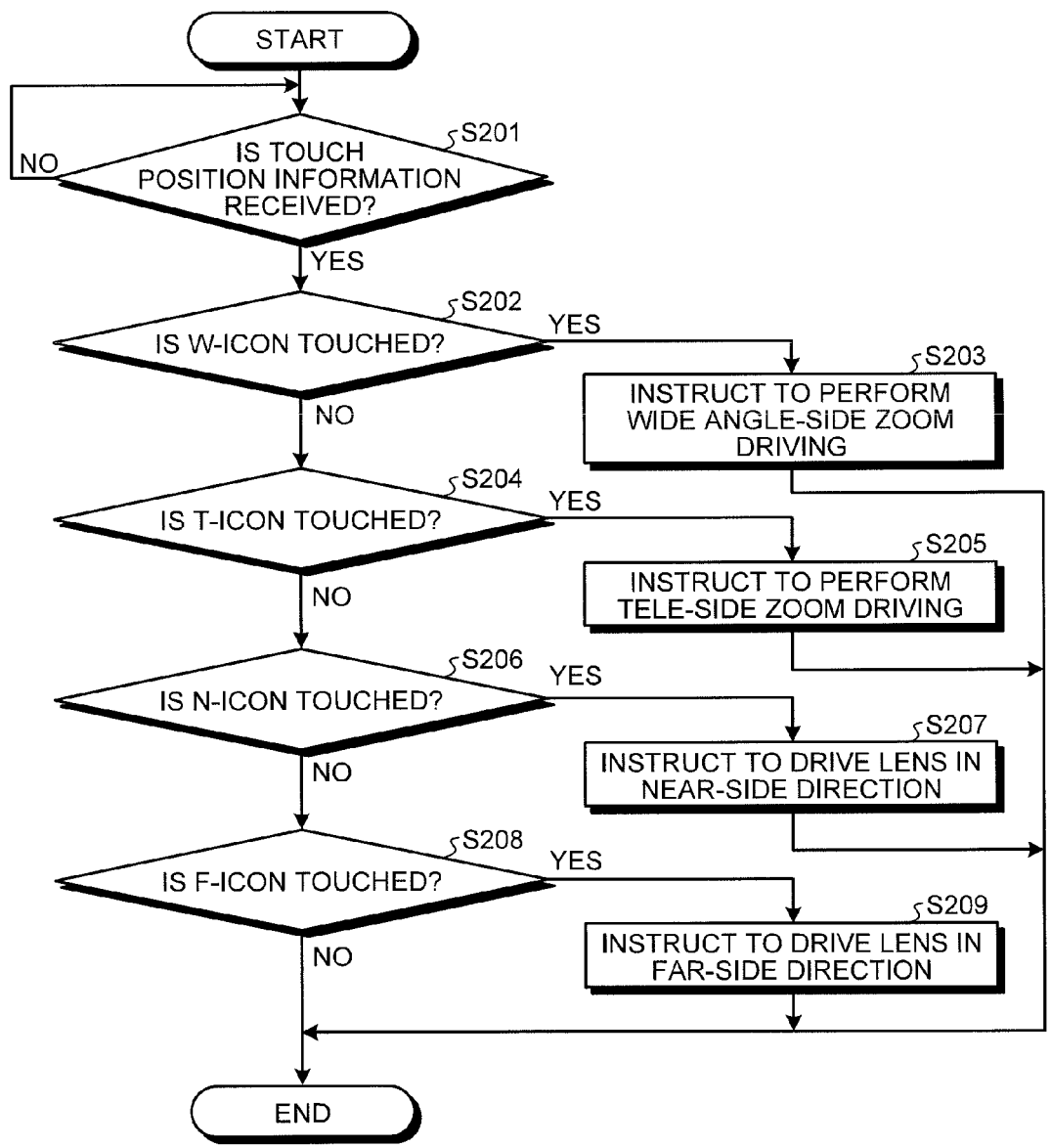
FIG. 9 is a flowchart illustrating an overview of the process performed by the lens controller of the camera system according to the first embodiment of the present invention.

Next, the operation performed by the LCPU 312 of the camera system 1 according to the first embodiment will be described. FIG. 9 is a flowchart illustrating an overview of the process performed by the LCPU 312.

As illustrated in FIG. 9, the LCPU 312 determines whether touch position information is received from the BCPU 219 via the body communication unit 218 and the lens communication unit. 311 (step S201). When the LCPU 312 determines that the touch position information is received from the BCPU 219 (Yes in step S201), the LCPU 312 proceeds to step S202. On the other hand, when the touch position information is not received from the BCPU 219 (No in step S201), the LCPU 312 repeats this determination every synchronous communication.

Subsequently, the LCPU 312 determines whether the W-icon A1 is touched based on the touch position information received from the BCPU 219 (step S202). Specifically, the LCPU 312 determines whether the touch position of the icon manipulation region 211b included in the touch position information transmitted from the BCPU 219 is within the display region of the W-icon A1 of the lens manipulation data table T1. When the LCPU 312 determines that the W-icon A1 has been touched (Yes in step S202), the LCPU 312 proceeds to step S203 described later. On the other hand, when the LCPU 312 determines that the W-icon A1 has not been touched (No in step S202), the LCPU 312 proceeds to step S204 described later.

In step S203, the LCPU 312 drives the zoom lens 306 in the wide angle-side direction based on the command information of wide angle-side zoom driving corresponding to the W-icon A1 and stops driving of the zoom lens 306 at a point in time when it is not possible to receive the touch position information transmitted from the BCPU 219. After that, the LCPU 312 ends this processing.

In step S204, the LCPU 312 determines whether the T-icon A2 is touched based on the touch position information received from the BCPU 219. When the LCPU 312 determines that the T-icon A2 has been touched (Yes in step S204), the LCPU 312 proceeds to step S205 described later. On the other hand, when the LCPU 312 determines that the T-icon A2 has not been touched (No in step S204), the LCPU 312 proceeds to step S206 described later.

In step S205, the LCPU 312 drives the zoom lens 306 in the tele-side direction based on the command information of tele-side zoom driving corresponding to the T-icon A2 and stops driving of the zoom lens 306 at a point in time when it is not possible to receive the touch position information transmitted from the BCPU 219. After that, the LCPU 312 ends this processing.

In step S206, the LCPU 312 determines whether the N-icon A3 is touched based on the touch position information received from the BCPU 219. When the LCPU 312 determines that the N-icon A3 has been touched (Yes in step S206), the LCPU 312 proceeds to step S207 described later. On the other hand, when the LCPU 312 determines that the N-icon A3 has not been touched (No in step S206), the LCPU 312 proceeds to step S208 described later.

In step S207, the LCPU 312 drives the focus lens 301 in the near-side direction based on the command information of near-side focus driving corresponding to the N-icon A3 and stops driving of the focus lens 301 at a point in time when it is not possible to receive the touch position information transmitted from the BCPU 219. After that, the LCPU 312 ends this processing.

In step S208, the LCPU 312 determines whether the F-icon A4 is touched based on the touch position information received from the BCPU 219. When the LCPU 312 determines that the F-icon A4 has been touched (Yes in step S208), the LCPU 312 proceeds to step S209 described later. On the other hand, when the LCPU 312 determines that the F-icon A4 has not been touched (No in step S208), the LCPU 312 ends this processing.

In step S209, the LCPU 312 drives the focus lens 301 in the far-side direction based on the command information which is manipulation correspondence data of far-side focus driving corresponding to the F-icon A4 and stops driving of the focus lens 301 at a point in time when it is not possible to receive the touch position information transmitted from the BCPU 219. After that, the LCPU 312 ends this processing.

According to the first embodiment described hereinabove, the LCPU 312 transmits the lens manipulation data to the BCPU 219 via the body communication unit 218 and the lens communication unit 311 and executes the driving command which is display region manipulation correspondence data corresponding to the touch position signal of the touch position information transmitted from the BCPU 219. In this way, it is possible to receive various manipulations without upgrading the firmware of the existing body portion 2 or introducing a new body portion 2. As a result, the user can perform the unique manipulations of the replacement lens device 3 or new manipulations.

Moreover, according to the first embodiment, when the replacement lens device 3 is attached to the body portion 2, the body portion 2 needs to acquire only icon manipulation image data. Thus, when the user performs manipulations on an icon, since the BCPU 219 needs to transmit only the touch position information to the LCPU 312, it is possible to perform various operations of the replacement lens device 3. For example, it is possible to shorten an activation time of the focus lens 301 and perform responsive manipulations.

Second Embodiment

Next, a second embodiment of the present invention will be described. In a camera system according to the second embodiment of the present invention, the lens manipulation data stored in the lens manipulation data storage unit is different from that of the camera system described above. Moreover, the processes performed by the BCPU and the LCPU of the camera system according to the second embodiment of the present invention are different from those of the camera system described above. Thus, in the following description, first, the lens manipulation data stored in the lens manipulation data storage unit will be described. Then, the processes performed by the BCPU and the LCPU will be described. In the drawings, the same portions are denoted by the same reference numerals.

FIG. 10 is a diagram illustrating an example of a lens manipulation data table as the lens manipulation data stored in the lens manipulation data storage unit 309a.

As illustrated in FIG. 10, a manipulation type, an icon display position, an icon display size, an icon image, and manipulation correspondence image data are described in a lens manipulation data table T3. For example, an icon display position of (10,15), an icon display size of 30×30, and an icon image of image data 1 are described for a manipulation type of wide-side zoom driving. Moreover, an icon display position of (10,115), an icon display size of 30×30, an icon image of image data 5, and manipulation correspondence image data of lens information image data are described for a manipulation type of lens information display. Furthermore, an icon display position of (60,116), an icon display size of 30×30, an icon image of image data 6, and a manipulation correspondence image data of manipulation guide image data are described for a manipulation type of manipulation guide display.

Figure 11A:
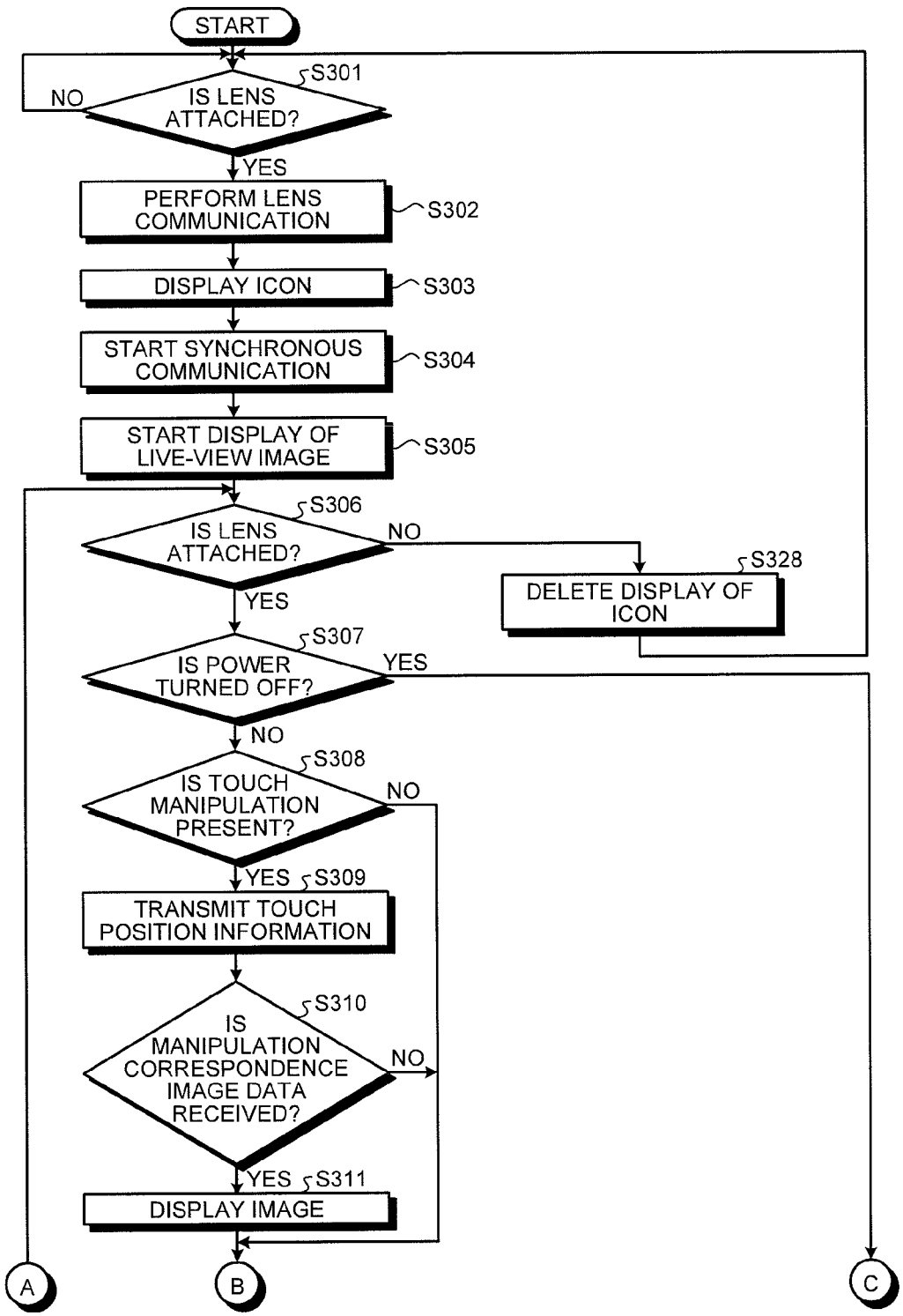
FIGS. 11A and 11B are flowcharts illustrating an overview of the process performed by a control unit of the camera system according to the second embodiment of the present invention.
Figure 11B:
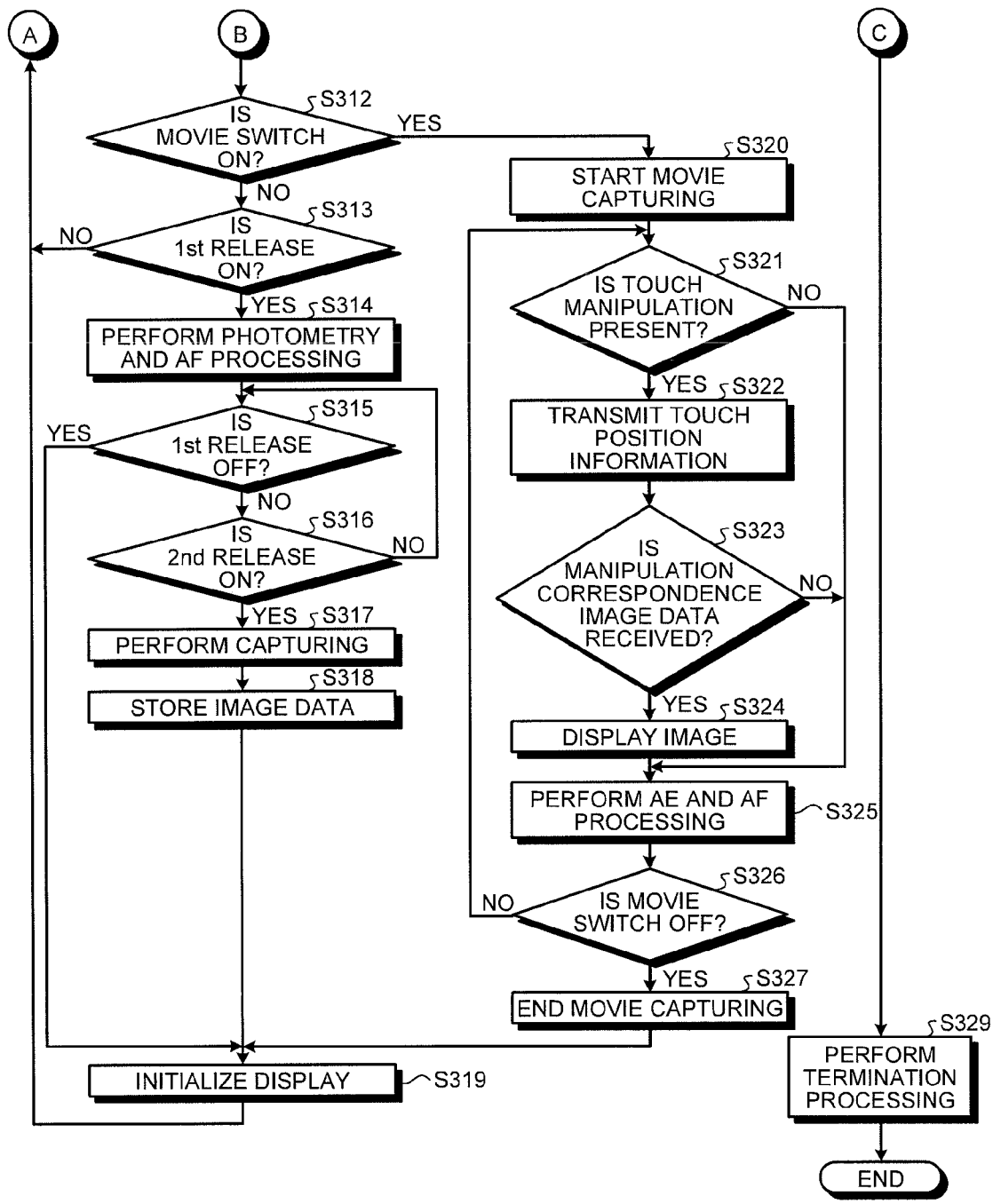

Next, the operation performed by the BCPU 219 of the camera system 1 according to the second embodiment will be described. FIGS. 11A and 11B are flowcharts illustrating an overview of the process performed by the BCPU 219.

In FIG. 11A, steps S301 and S302 correspond to steps S101 and S102 illustrated in FIG. 6A, respectively.

Figure 12:
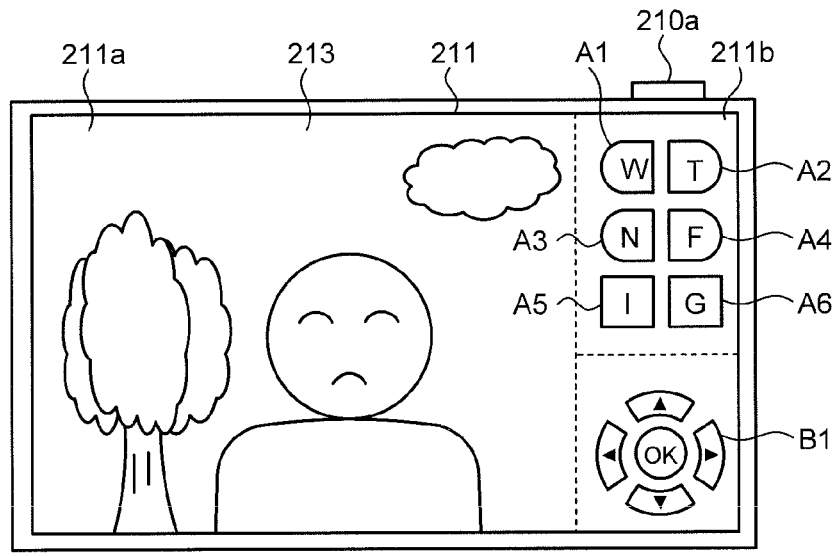
FIG. 12 is a diagram illustrating an example in which the control unit displays manipulation icons in an icon manipulation region of the display unit.
Figure 13:
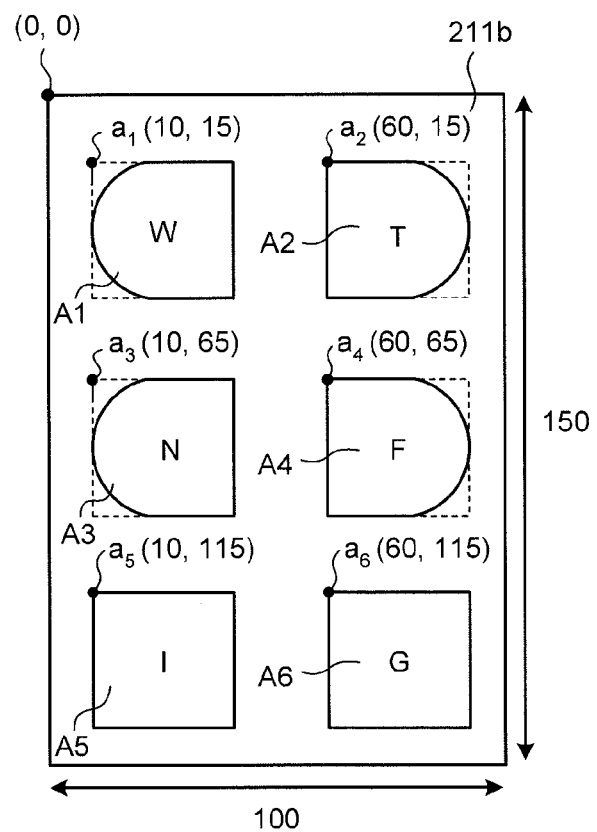
FIG. 13 is a diagram illustrating an example of a display position at which the control unit displays manipulation icons in an icon manipulation region of the display unit.

In step S303, the BCPU 219 displays a lens manipulation icon in the icon manipulation region 211b of the display unit 211 based on the lens manipulation data received from the LCPU 312. Specifically, as illustrated in FIG. 12, the BCPU 219 displays manipulation icons A1 to A6 at predetermined positions $a_1$ to $a_6$ of the icon manipulation region 211b, respectively, by referring to the lens manipulation data table T3 transmitted from the LCPU 312 (see FIG. 13).

Steps S304 to S309 correspond to steps S104 to S109 illustrated in FIG. 6A, respectively.

In step S310, the BCPU 219 determines whether manipulation correspondence image data is received from the LCPU 312 via the body communication unit 218 and the lens communication unit 311. When the BCPU 219 determines that the manipulation correspondence image data has been received from the LCPU 312 (Yes in step S310), the BCPU 219 proceeds to step S311 described later. On the other hand, when the BCPU 219 determines that the manipulation correspondence image data has not been received from the LCPU 312 (No in step S310), the BCPU 219 proceeds to step S312 described later.

Figure 14:
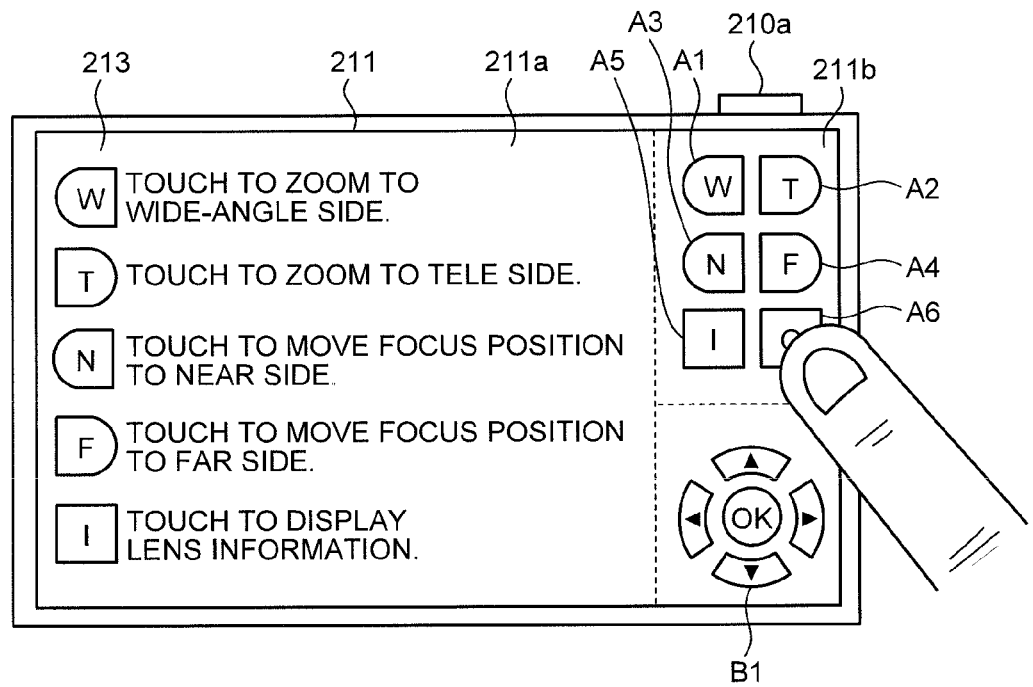
FIG. 14 is a diagram illustrating an example of an image illustrating the manipulation contents of respective icons which the control unit displays in an image display region of the display unit.
Figure 15:
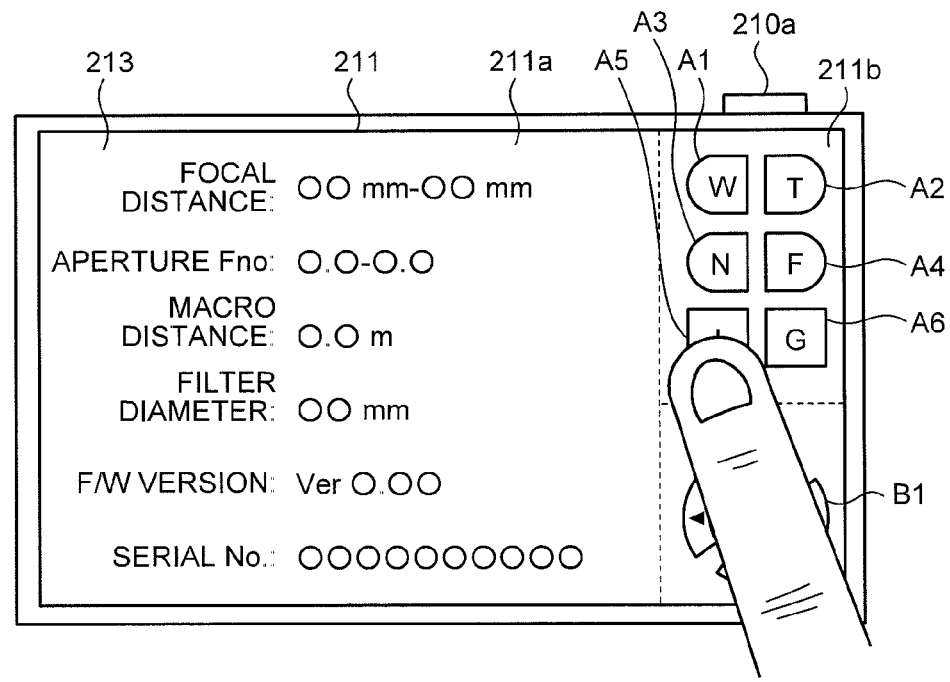
FIG. 15 is a diagram illustrating an example of an image illustrating lens information of the replacement lens device, which the control unit displays in the image display region of the display unit.

In step S311, the BCPU 219 displays an image corresponding to the manipulation correspondence image data received from the LCPU 312 on the display unit 211. Specifically, when the received manipulation correspondence image data is manipulation guide image data, the BCPU 219 displays an image representing the manipulation contents of respective icons in the image display region 211a of the display unit 211 (see FIG. 14). Moreover, when the received manipulation correspondence image data is lens information image data, the BCPU 219 displays an image representing the lens information of the replacement lens device 3 in the image display region 211a of the display unit 211 (see FIG. 15).

Steps S312 to S322 correspond to steps S110 to S120 of FIG. 6B, respectively.

Steps S323 to S324 correspond to steps S310 to S311 described above, respectively.

Steps S325 to S329 correspond to steps S121 to S125 of FIGS. 6A and 6B, respectively.

Figure 16:
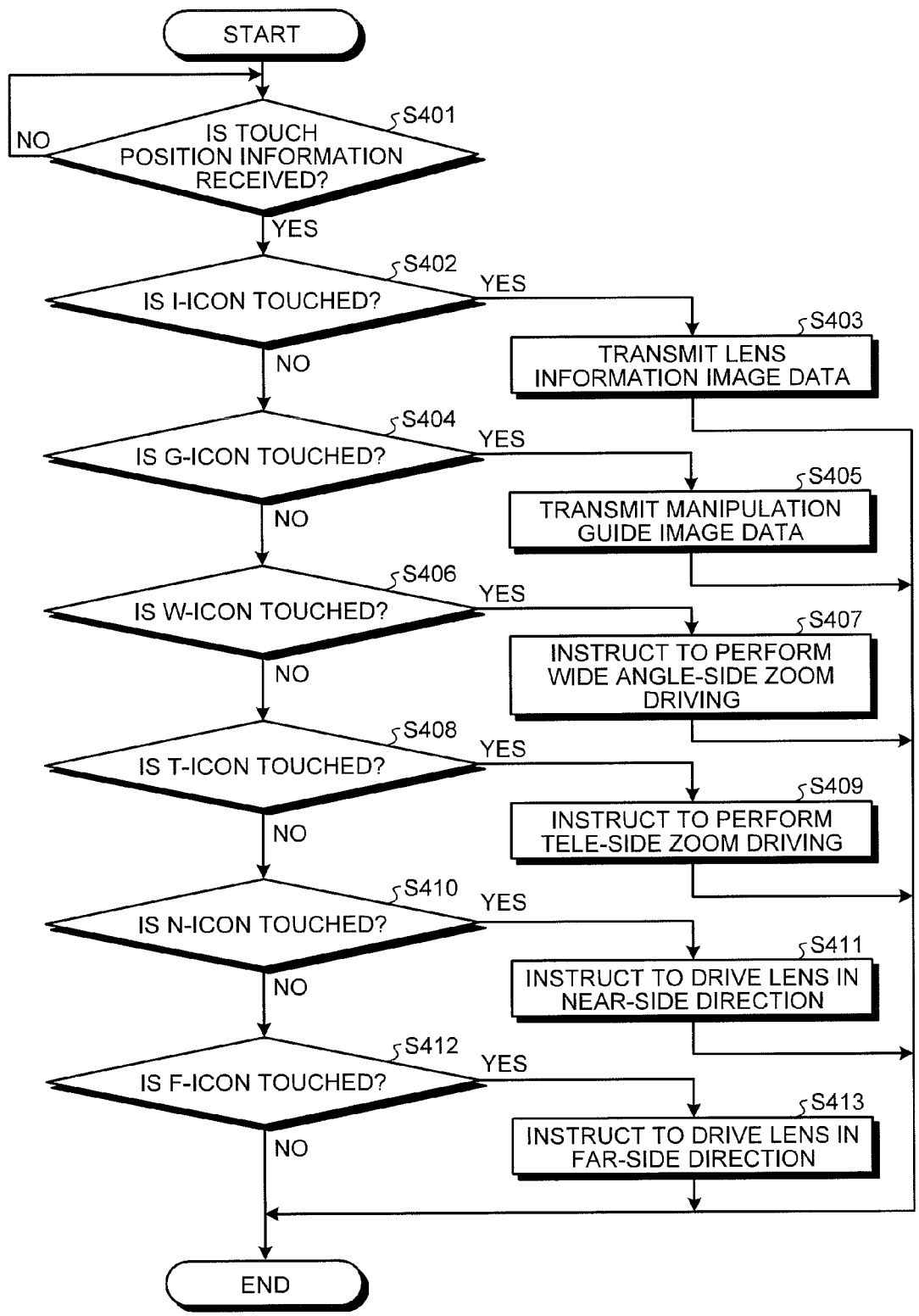
FIG. 16 is a flowchart illustrating an overview of the process performed by the lens controller according to the second embodiment of the present invention.

Next, the operation of the LCPU 312 of the camera system 1 according to the second embodiment will be described. FIG. 16 is a flowchart illustrating an overview of the process performed by the LCPU 312.

As illustrated in FIG. 16, the LCPU 312 determines whether touch position information is received from the BCPU 219 via the body communication unit 218 and the lens communication unit 311 (step S401). When the LCPU 312 determines that touch position information has been received from the BCPU 219 (Yes in step S401), the LCPU 312 proceeds to step S402. On the other hand, when the touch position information has not been received from the BCPU 219 (No in step S401), the LCPU 312 repeats this determination every synchronous communication.

Subsequently, the LCPU 312 determines whether an I-icon A5 is touched based on the touch position information received from the BCPU 219 (step S402). Specifically, the LCPU 312 determines whether the touch position of the icon manipulation region 211b included in the touch position information transmitted from the BCPU 219 is within the display region of the I-icon A5 of the lens manipulation data table T3. When the LCPU 312 determines that the I-icon A5 has been touched (Yes in step S402), the LCPU 312 proceeds to step S403 described later. On the other hand, when the LCPU 312 determines that the I-icon A5 has not been touched (No in step S402), the LCPU 312 proceeds to step S404 described later.

In step S403, the LCPU 312 transmits the lens information image data to the BCPU 219 via the body communication unit 218 and the lens communication unit 311. In this way, the user can check the lens information of the replacement lens device 3 from the lens information image (see FIG. 15) displayed on the display unit 211. After that, the LCPU 312 ends this processing.

In step S404, the LCPU 312 determines whether a G-icon A6 is touched based on the touch position information received from the BCPU 219. When the LCPU 312 determines that the G-icon A6 has been touched (Yes in step S404), the LCPU 312 proceeds to step S405 described later. On the other hand, when the LCPU 312 determines that the G-icon A6 has not been touched (No in step S404), the LCPU 312 proceeds to step S406 described later.

In step S405, the LCPU 312 transmits manipulation guide image data to the BCPU 219 via the body communication unit 218 and the lens communication unit 311 (step S405). In this way, the user can check the manipulation contents of the respective manipulation icons from the manipulation guide image (see FIG. 14) displayed on the display unit 211. After that, the LCPU 312 ends this processing.

Steps S406 to S413 correspond to steps S202 to S209 of FIG. 9, respectively.

According to the second embodiment described hereinabove, the LCPU 312 transmits the lens manipulation data to the BCPU 219 via the body communication unit 218 and the lens communication unit 311 and executes the driving command which is display region manipulation correspondence data corresponding to the touch position signal of the touch position information transmitted from the BCPU 219. In this way, it is possible to receive various manipulations without upgrading the firmware of the existing body portion 2 or introducing a new body portion 2. As a result, the user can perform the unique manipulations of the replacement lens device 3 or new manipulations.

Moreover, according to the second embodiment, since necessary information is acquired whenever an icon is manipulated, even when the replacement lens device 3 which includes many display items is attached to the body portion 2 having a small storage capacity, it is possible to reliably display all information (manipulation icons and the like).

First Modification Example of Second Embodiment

In the second embodiment described above, lens manipulation icons of a replacement lens device different from the replacement lens device 3 may be displayed instead of the lens manipulation icons which the BCPU 219 displays in the icon manipulation region 211b of the display unit 211.

Figure 17:
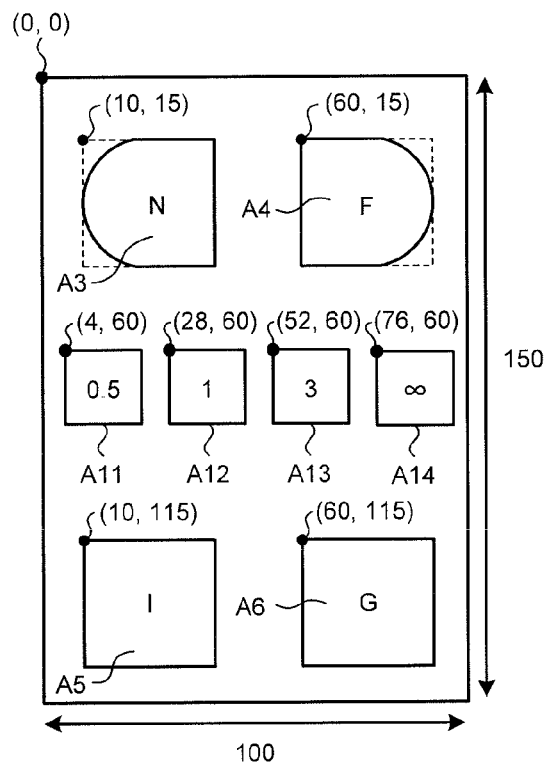
FIG. 17 is diagram illustrating an example of lens manipulation icons which a control unit according to a first modification example of the second embodiment of the present invention displays in the icon manipulation region of the display unit.

FIG. 17 is a diagram illustrating an example of lens manipulation icons which the BCPU 219 according to the first modification example of the second embodiment displays in the icon manipulation region 211b of the display unit 211. In FIG. 17, the type of the replacement lens device 3 is described to be a single focus lens.

As illustrated in FIG. 17, the BCPU 219 displays lens manipulation icons in the icon manipulation region 211b of the display unit 211 based on manipulation icon data received from the LCPU 312 via the body communication unit 218 and the lens communication unit 311. Specifically, the BCPU 219 displays the N-icon A3, the F-icon A4, the I-icon A5, and the G-icon A6 and displays icons A11 to A14 representing the subject distance corresponding to the focus position of the replacement lens device 3. In this way, when the icon A11 is touched, for example, the LCPU 312 can drive the focus lens 301 based on the touch position information transmitted from the BCPU 219 so that the focus position of the replacement lens device 3 is at such a position that a subject at a distance of 0.5 m is focused. As a result, it is possible to perform the unique manipulations of the new replacement lens device 3 or new manipulations without upgrading the firmware of the existing body portion 2 or purchasing a new body portion 2.

Second Modification Example of Second Embodiment

Figure 18:
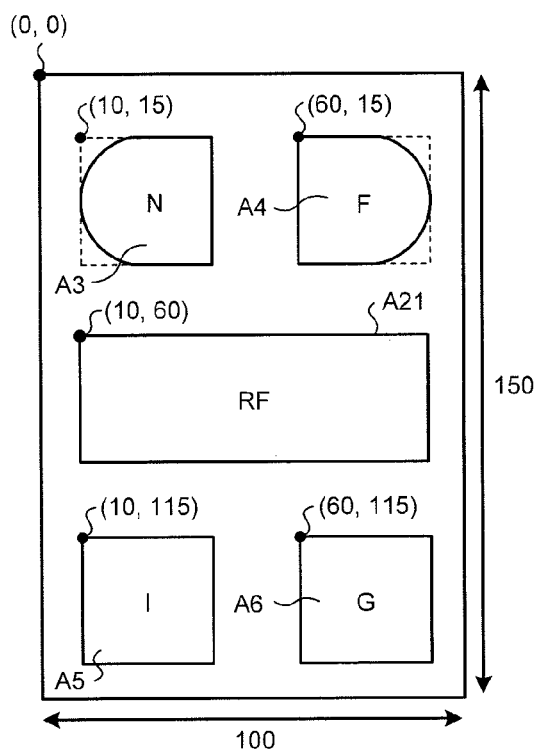
FIG. 18 is a diagram illustrating another example of lens manipulation icons which a control unit according to a second modification example of the second embodiment of the present invention displays in the icon manipulation region of the display unit.

FIG. 18 is a diagram illustrating another example of lens manipulation icons which the BCPU 219 according to the second modification example of the second embodiment displays in the icon manipulation region 211b of the display unit 211. In FIG. 18, the type of the replacement lens device 3 is described to be a single focus lens.

As illustrated in FIG. 18, the BCPU 219 displays lens manipulation icons in the icon manipulation region 211b of the display unit 211 based on manipulation icon data transmitted from the LCPU 312 via the body communication unit 218 and the lens communication unit 311. Specifically, the BCPU 219 displays the N-icon A3, the F-icon A4, the I-icon A5, and the G-icon A6 on the display unit 211 and displays a reference focus icon A21 (hereinafter referred to as an "RF-icon A21") that limits the focus position of the replacement lens device 3 to a predetermined position on the display unit 211.

In the state illustrated in FIG. 18, when the touch position included in the touch position information received from the BCPU 219 via the body communication unit 218 and the lens communication unit 311 is on a display region of the RF-icon A21, the LCPU 312 transmits icon image data of the respective icons A11 to A14 which represent the manipulation contents of the RF-icon A21 to the BCPU 219.

Subsequently, the BCPU 219 displays the respective icons A11 to A14 on the display unit 211 instead of the RF-icon A21 based on the icon image data received from the LCPU 312 (see FIG. 17).

After that, when the icon A11 is touched, for example, the LCPU 312 can drive the focus lens 301 based on the touch position information transmitted from the BCPU 219 so that the focus position of the replacement lens device 3 is at such a position that a subject at a distance of 0.5 m is focused.

In this way, it is possible to perform the unique manipulations of the new replacement lens device 3 or new manipulations without upgrading the firmware of the existing body portion 2 or purchasing a new body portion 2.

Third Modification Example of Second Embodiment

Figure 19:
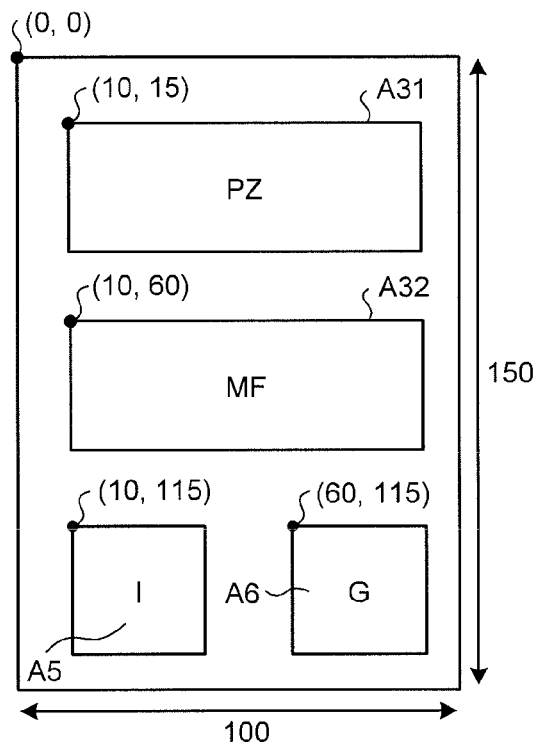
FIG. 19 is a diagram illustrating another example of lens manipulation icons which a control unit according to a third modification example of the second embodiment of the present invention displays in the icon manipulation region of the display unit.

FIG. 19 is a diagram illustrating another example of lens manipulation icons which the BCPU 219 according to the third modification example of the second embodiment displays in the icon manipulation region 211b of the display unit 211. In FIG. 19, the type of the replacement lens device 3 is described to be a zoom lens.

As illustrated in FIG. 19, the BCPU 219 displays lens manipulation icons in the icon manipulation region 211b of the display unit 211 based on the manipulation icon data transmitted from the LCPU 312 via the body communication unit 218 and the lens communication unit 311. Specifically, the BCPU 219 displays the I-icon A5 and the G-icon A6 on the display unit 211 and displays a preset zoom icon A31 (hereinafter referred to as a "PZ-icon A31") and a manual focus icon A32 on the display unit 211.

In the state illustrated in FIG. 19, when the touch position included in the touch position information which the LCPU 312 received from the BCPU 219 via the body communication unit 218 and the lens communication unit 311 is on a display region of the PZ-icon A31, the LCPU 312 transmits icon image data of the respective icons A311 to A314 which represent the respective zoom ratios which are the manipulation contents of the PZ-icon A31 to the BCPU 219.

Figure 20:
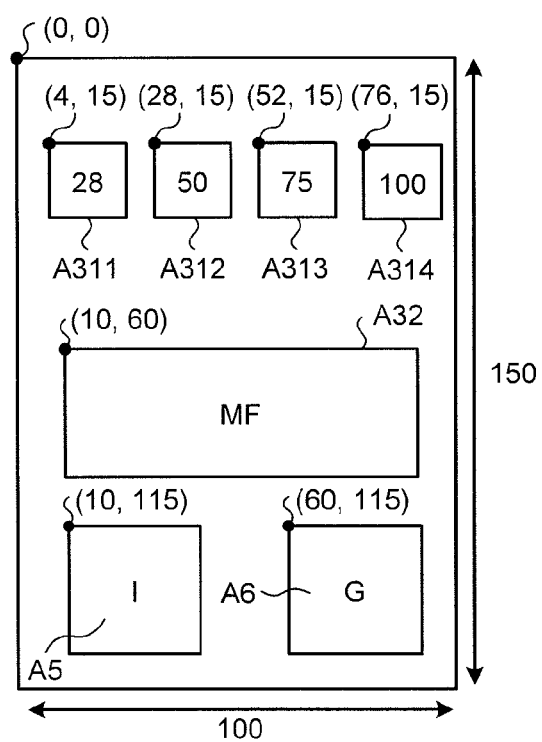
FIG. 20 is a diagram illustrating an example of a state where lens manipulation icons have transitioned from the state illustrated in FIG. 19.

Subsequently, the BCPU 219 displays the icons A311 to A314 on the display unit 211 instead of the PZ-icon A31 based on the icon image data received from the LCPU 312 (see FIG. 20).

Figure 21:
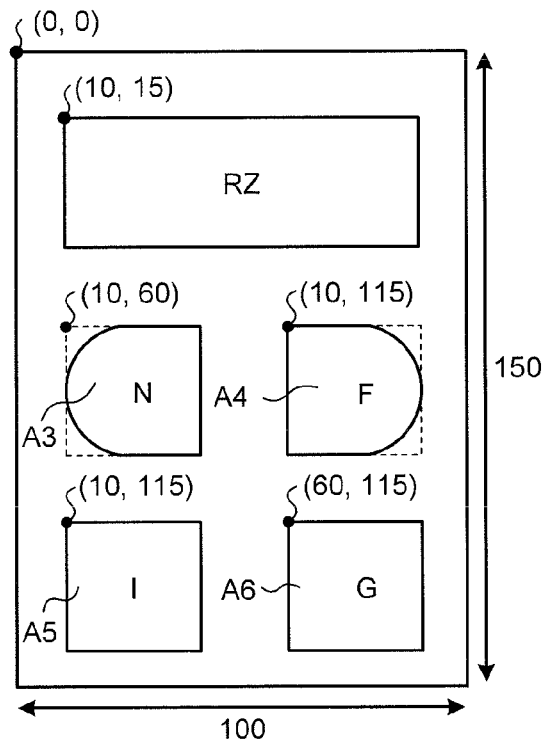
FIG. 21 is a diagram illustrating another example of a state where lens manipulation icons have transitioned from the state illustrated in FIG. 19.

Moreover, in the state illustrated in FIG. 19, when the touch position included in the touch position information which the LCPU 312 received from the BCPU 219 via the body communication unit 218 and the lens communication unit 311 is on a display region of the MF-icon A32, the LCPU 312 transmits icon image data (see FIG. 21) of the N-icon A3 and the F-icon A4 which represent the manipulation contents of the MF-icon A32 to the BCPU 219.

After that, when the icon A311 is touched, for example, the LCPU 312 drives the zoom lens 306 based on the touch position information transmitted from the BCPU 219 so that the focal distance of the replacement lens device 3 becomes 28 mm.

As above, in the third modification example of the second embodiment, it is also possible to perform the unique manipulations of the new replacement lens device 3 or new manipulations without upgrading the firmware of the existing body portion 2 or purchasing a new body portion 2.

Figure 22:
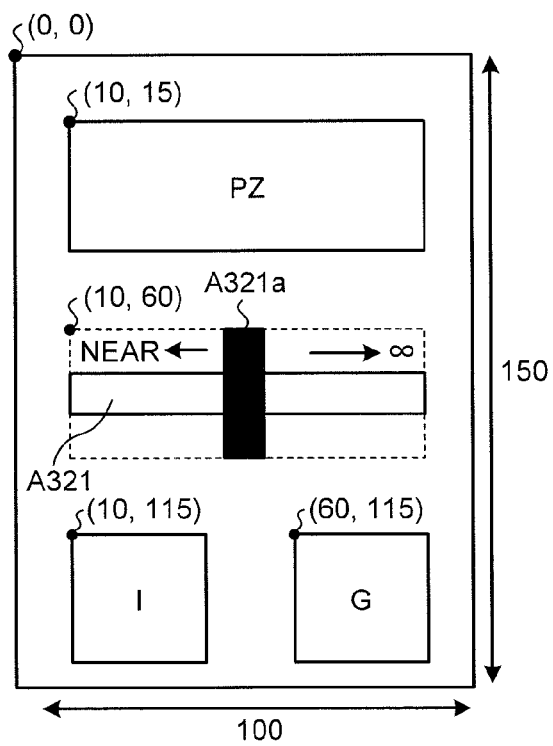
FIG. 22 is a diagram illustrating another example of a state where lens manipulation icons have transitioned from the state illustrated in FIG. 19.

In the third modification example of the second embodiment, when the touch position included in the touch position information which the LCPU 312 received from the BCPU 219 via the body communication unit 218 and the lens communication unit 311 is on the display region of the MF-icon A32, the LCPU 312 transmits the icon image data of the N-icon A3 and the F-icon A4 which represent the manipulation contents of the MF-icon A32 to the BCPU 219. However, for example, the LCPU 312 may transmit icon image data of a slidebar icon A321 as illustrated in FIG. 22 to the BCPU 219. In this case, the LCPU 312 may transmit the icon image data of an indicator icon A321a representing an indicator on the slidebar icon A321 every synchronization cycle to the BCPU 219 in accordance with the touch position information transmitted from the BCPU 219. In this way, the user can intuitively understand the focus position of the new replacement lens device 3 and perform the unique manipulations of the replacement lens device 3 or new manipulations without upgrading the firmware of the existing body portion 2 or purchasing a new body portion 2.

Third Embodiment

Next, a third embodiment of the present invention will be described. A camera system according to the third embodiment of the present invention further includes an external strobe device as external equipment which is detachable from a body portion. Moreover, the body portion has a different configuration from that of the above embodiment. Furthermore, the respective units of the camera system according to the third embodiment of the present invention perform different processes from those of the above embodiment. Thus, in the following description, first, the configuration of the body portion and the configuration of the external strobe device will be described. Then, the processes of the respective units of the third embodiment of the present invention will be described. In the drawings, the same portions will be denoted by the same reference numerals.

Figure 23:
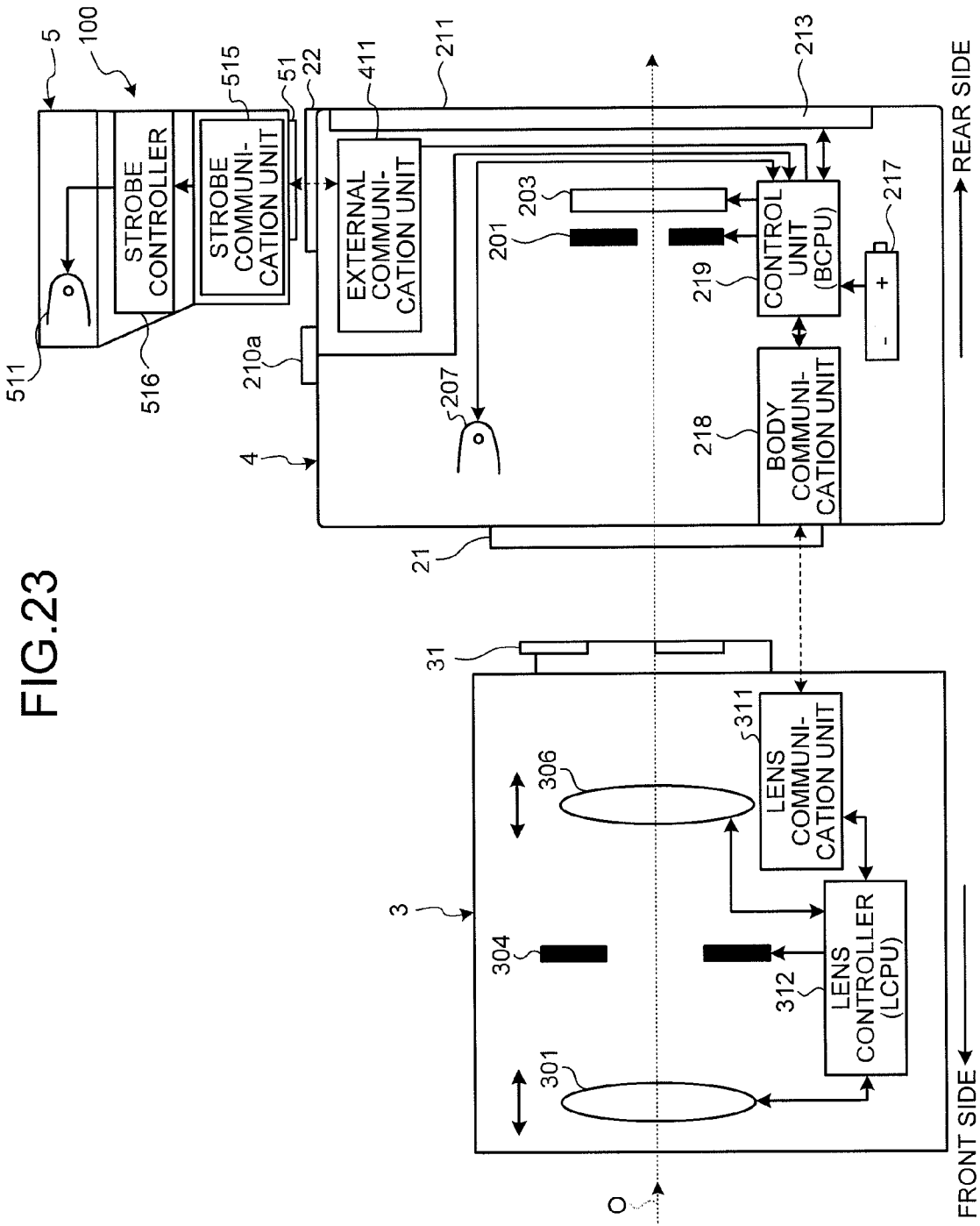
FIG. 23 is a schematic configuration diagram of a camera system to which a replacement lens device and an external strobe device according to a third embodiment of the present invention are attached.
Figure 24:
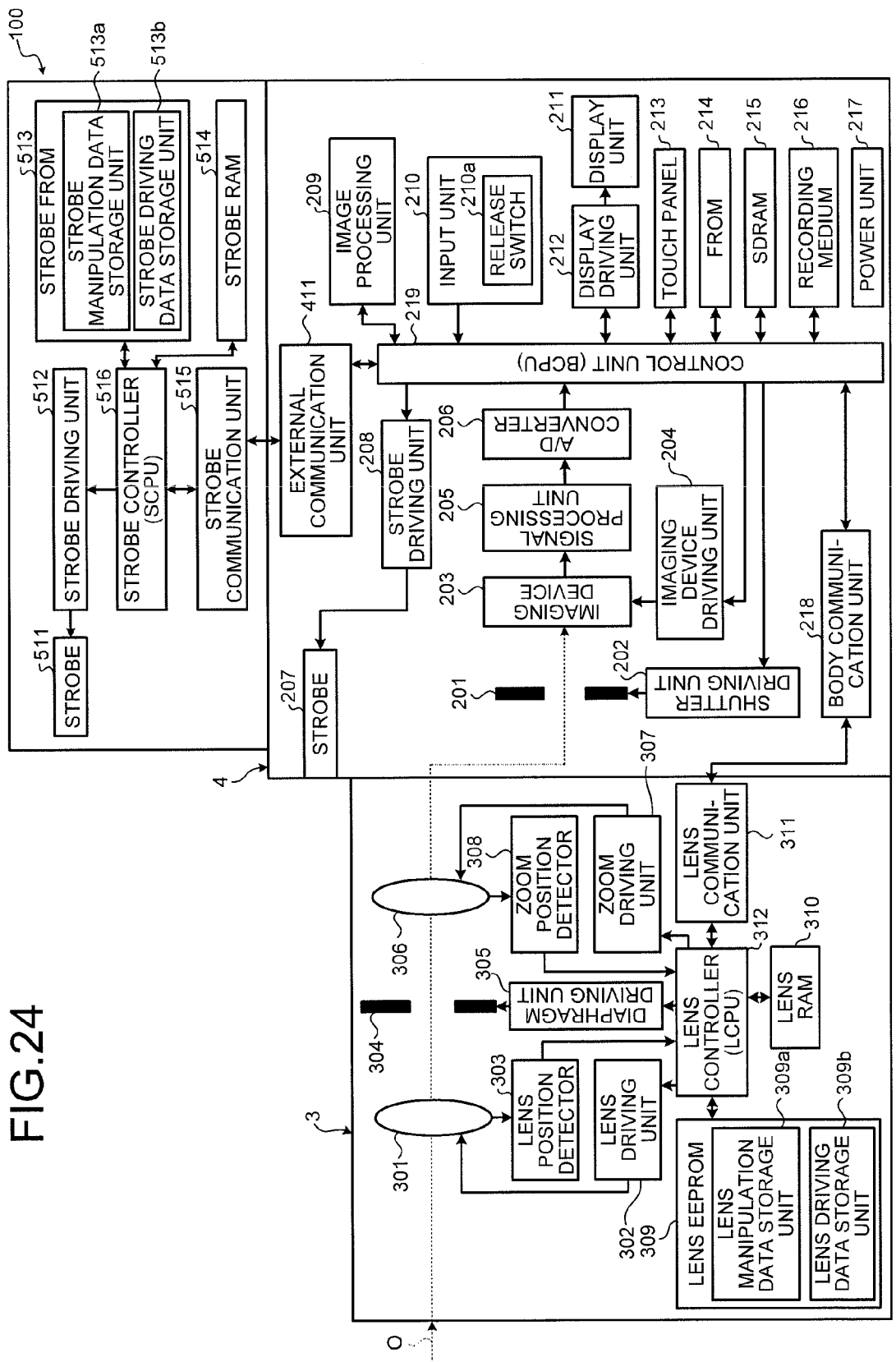
FIG. 24 is a block diagram illustrating a configuration of a camera system to which a replacement lens device and an external strobe device according to the third embodiment of the present invention are attached.

FIG. 23 is a schematic configuration diagram of a camera system to which a replacement lens device and an external strobe device according to the third embodiment of the present invention are attached. FIG. 24 is a block diagram illustrating a configuration of the camera system to which the replacement lens device and the external strobe device according to the third embodiment of the present invention are attached. In FIGS. 23 and 24, the left and right sides will be described as front and rear sides, respectively.

A camera system 100 illustrated in FIGS. 23 and 24 includes a body portion 4, a replacement lens device 3 that is attachable to the body portion 4, and an external strobe device 5 that is attachable to the body portion 4. The external strobe device 5 is attached to the body portion 4 by connecting a connection portion 51 formed on the bottom surface of the external strobe device 5 to a hot shoe 22 for connecting accessories formed on the top surface of the body portion 4. In this way, the body portion 4 and the external strobe device 5 are integrally connected.

The body portion 4 includes a shutter 201, a shutter driving unit 202, an imaging device 203, an imaging device driving unit 204, a signal processing unit 205, an A/D converter 206, a strobe 207, a strobe driving unit 208, an image processing unit 209, an input unit 210, a display unit 211, a display driving unit 212, a touch panel 213, an FROM 214, an SDRAM 215, a recording medium 216, a power unit 217, a body communication unit 218, a BCPU 219, and an external communication unit 411.

The external communication unit 411 is a communication interface for performing communication with the external strobe device 5 attached to the body portion 4. The external communication unit 411 can also communicate with external equipment devices which are external accessories such as an auxiliary illumination device using LEDs and the like, a GPS device, a voice recording microphone, an electronic viewfinder (EVF), and a radio communication unit, which are attached to the body portion 4, in addition to the external strobe device 5.

The external strobe device 5 includes a strobe 511, a strobe driving unit 512, a strobe FROM 513, a strobe RAM 514, a strobe communication unit 515, and a strobe controller 516 (hereinafter referred to as an "SCPU 516").

The strobe 511 is configured using a xenon lamp, an LED, or the like. The strobe 511 emits light toward a predetermined view-field region in synchronization with the exposure operation of the shutter 201. The strobe driving unit 512 causes the strobe 511 to emit light under the control of the SCPU 516.

The strobe FROM 513 is configured using nonvolatile memory and stores programs of the SCPU 516 and various parameters of the strobe 511. The strobe FROM 513 includes a strobe manipulation data storage unit 513a and a strobe driving data storage unit 513b. The strobe manipulation data storage unit 513a stores strobe manipulation icon image data of strobe manipulation icons representing the manipulation contents of the external strobe device 5. The strobe driving data storage unit 513b stores the driving information of the external strobe device 5.

The strobe RAM 514 is configured using volatile memory and temporarily stores information under the processing of the SCPU 516.

The strobe communication unit 515 is a communication interface for performing communication with the external communication unit 411 of the body portion 4 when the external strobe device 5 is attached to the body portion 4. Moreover, power is supplied from the power unit 217 of the body portion 4 to the respective units of the external strobe device 5 via the strobe communication unit 515 and the external communication unit 411.

The SCPU 516 is configured using a CPU or the like and controls the operations of the respective units of the external strobe device 5. Specifically, the SCPU 516 causes the strobe 511 to perform a charging operation or a light emitting operation by driving the strobe driving unit 512. Moreover, the SCPU 516 communicates with the BCPU 219 via the external communication unit 411 and the strobe communication unit 515 to receive touch position information on the position where the touch panel 213 is touched and transmit the charging state of the external strobe device 5 and the strobe manipulation icon image data stored in the strobe FROM 513.

Figure 25A:
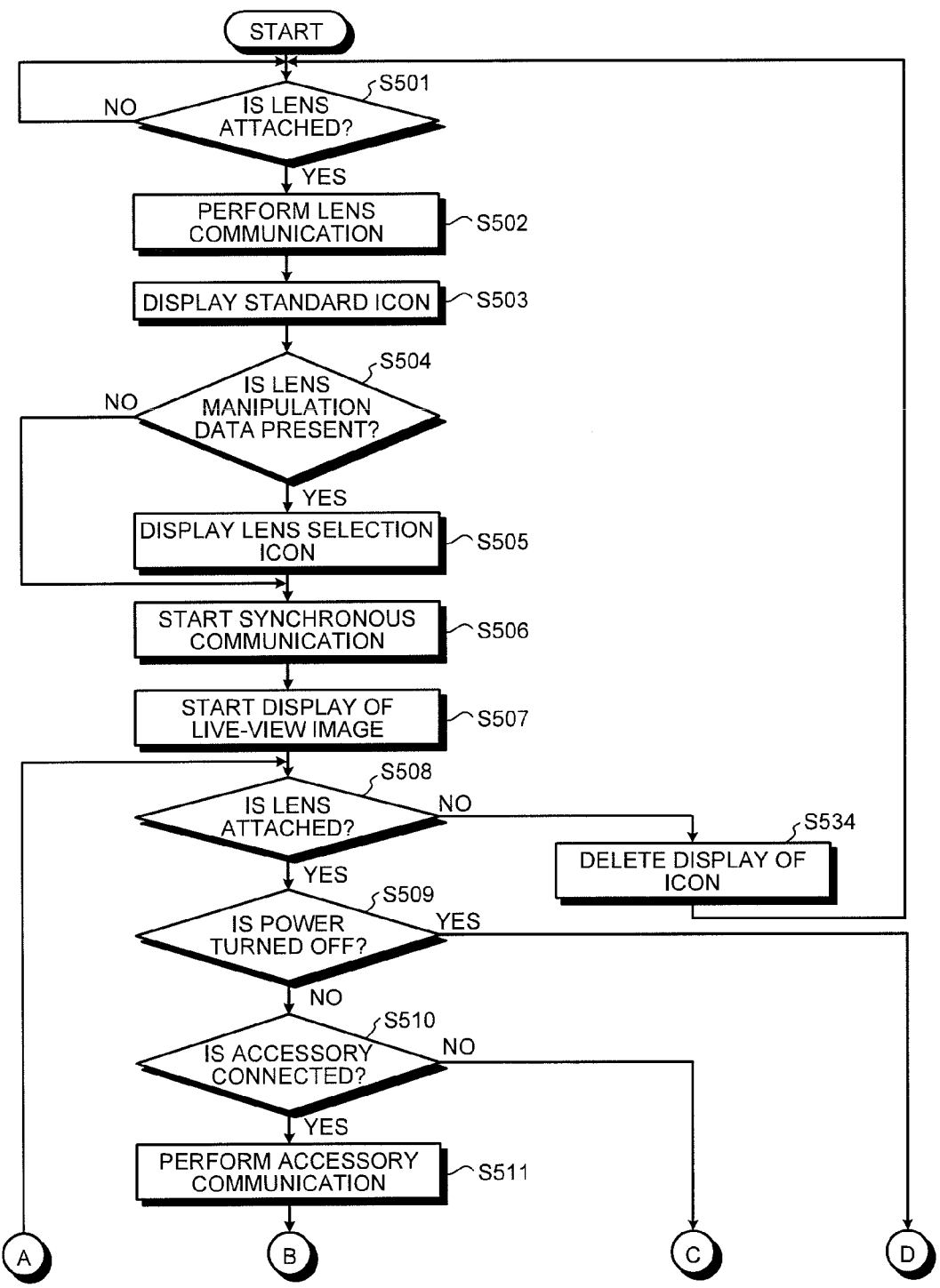

Next, the operation of the BCPU 219 of the camera system 100 according to the third embodiment will be described. FIGS. 25A and 25B are flowcharts illustrating an overview of the process performed by the BCPU 219. In the following description, the external strobe device 5 is described as an example of the accessories of the external equipment.

In FIG. 25A, steps S501 and S502 correspond to steps S101 and S102 illustrated in FIG. 6A, respectively.

Figure 26:
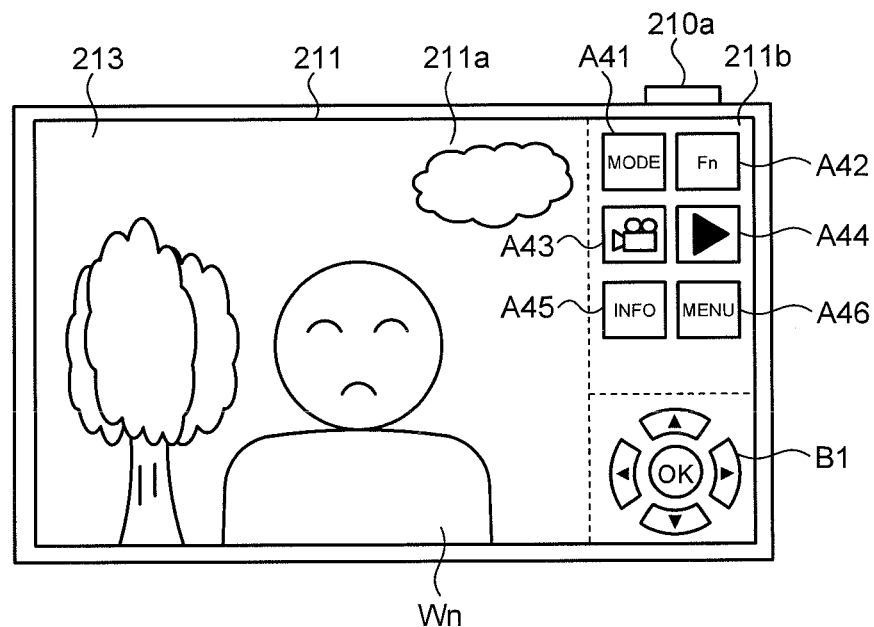
FIG. 26 is a diagram illustrating an example of standard icons which the control unit displays in an icon manipulation region of the display unit.

Subsequently, the BCPU 219 displays standard icons for receiving the input of shooting modes and menu display of the camera system 100 in the icon manipulation region 211b of the display unit 211 (step S503). Specifically, as illustrated in FIG. 26, the BCPU 219 displays standard icons (A41 to A46) in the icon manipulation region 211b of the display unit 211.

The icon A41 is an icon for receiving the display of a shooting mode setting screen of the camera system 100 in the image display region 211a. The icon A42 is an icon for receiving the execution of a manipulation function allocated by the user. The icon A43 is an icon for receiving the start of movie capturing. The icon A44 is an icon for receiving the playback display of the captured image. The icon A45 is an icon for receiving the display of various types of information in the image display region 211a of the display unit 211. The icon A46 is an icon for receiving the display of various menu setting screens in the image display region 211a of the display unit 211.

Figure 27:
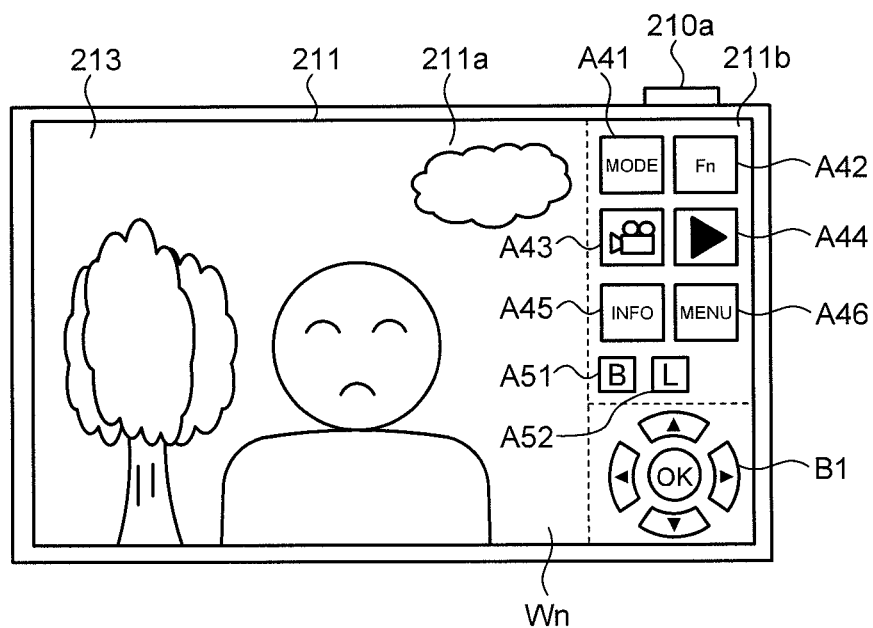
FIG. 27 is a diagram illustrating an example of lens selection icons which the control unit displays in the icon manipulation region of the display unit.

After step S503, the BCPU 219 determines whether lens manipulation data is present in the lens data acquired from the replacement lens device 3 (step S504). When the BCPU 219 determines that lens manipulation data is present in the lens data acquired from the replacement lens device 3 (Yes in step S504), the BCPU 219 displays a lens selection icon corresponding to the lens manipulation data in the icon manipulation region 211b of the display unit 211 (step S505). Specifically, as illustrated in FIG. 27, the BCPU 219 displays an L-icon A52 in the icon manipulation region 211b of the display unit 211 and displays a B-icon A51 in the icon manipulation region 211b of the display unit 211. The B-icon A51 is an icon for receiving the display of standard icons in the icon manipulation region 211b of the display unit 211. The L-icon A52 will be described later. After that, the BCPU 219 proceeds to step S506.

In contrast, when the BCPU 219 determines that the lens manipulation data is not present in the lens data acquired from the replacement lens device 3 (No in step S504), the BCPU 219 proceeds to step S506.

Steps S506 to S509 correspond to steps S104 to S107 illustrated in FIG. 6A, respectively.

In step S510, the BCPU 219 determines whether an accessory is connected to the body portion 4. When the BCPU 219 determines that an accessory is connected to the body portion 4 (Yes in step S510), the BCPU 219 proceeds to step S511 described later. On the other hand, when the BCPU 219 determines that an accessory is not connected to the body portion 4 (No in step S510), the BCPU 219 proceeds to step S532 described later.

In step S511, the BCPU 219 performs accessory communication with the SCPU 516 via the external communication unit 411 and the strobe communication unit 515. Specifically, the BCPU 219 acquires strobe data of the external strobe device 5 and stores the strobe data in the SDRAM 215.

Figure 28:
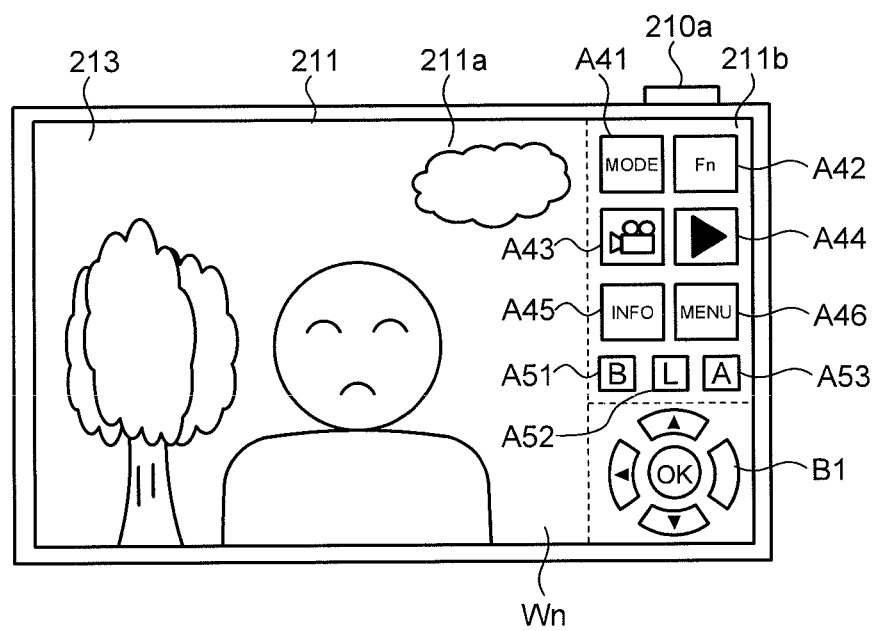
FIG. 28 is a diagram illustrating an example of an accessory selection icon which the control unit displays in the icon manipulation region of the display unit.

Subsequently, the BCPU 219 determines whether accessory manipulation data is present in the strobe data acquired from the external strobe device 5 (step S512). When the BCPU 219 determines that accessory manipulation data is present (Yes in step S512), the BCPU 219 displays an accessory selection icon in the icon manipulation region 211b of the display unit 211 (step S513). Specifically, as illustrated in FIG. 28, the BCPU 219 displays an accessory selection icon A53 corresponding to the accessory manipulation data in the icon manipulation region 211b of the display unit 211. After that, the BCPU 219 proceeds to step S514.

In contrast, when the BCPU 219 determines that accessory manipulation data is not present in the strobe data acquired from the external strobe device 5 (No in step S512), the BCPU 219 proceeds to step S514 described later.

Steps S514 and S515 correspond to steps S108 and S109 illustrated in FIG. 6A, respectively.

After step S515, the BCPU 219 executes an icon display switching process of switching the display of icons displayed in the icon manipulation region 211b of the display unit 211 based on the data received from the LCPU 312 and the SCPU 516 (step S516). The content of the icon display switching process will be described later.

Steps S517 to S527 correspond to steps S110 to S120 illustrated in FIG. 6B, respectively.

After step S527, the BCPU 219 executes the icon display switching process of step S516 (step S528). The content of the icon display switching process will be described later.

Steps S529 to S531 correspond to steps S121 to S123 illustrated in FIG. 6B, respectively.

In step S532, the BCPU 219 determines whether the accessory is detached from the body portion 4. When the BCPU 219 determines that the accessory is detached from the body portion 4 (Yes in step S532), the BCPU 219 switches the display of icons displayed in the icon manipulation region 211b of the display unit 211 (step S533) and proceeds to step S514. On the other hand, when the BCPU 219 determines that the accessory is not detached from the body portion 4 (No in step S532), the BCPU 219 proceeds to step S514.

Steps S534 and S535 correspond to steps S124 and S125 illustrated in FIGS. 6A and 6B, respectively.

Figure 29:
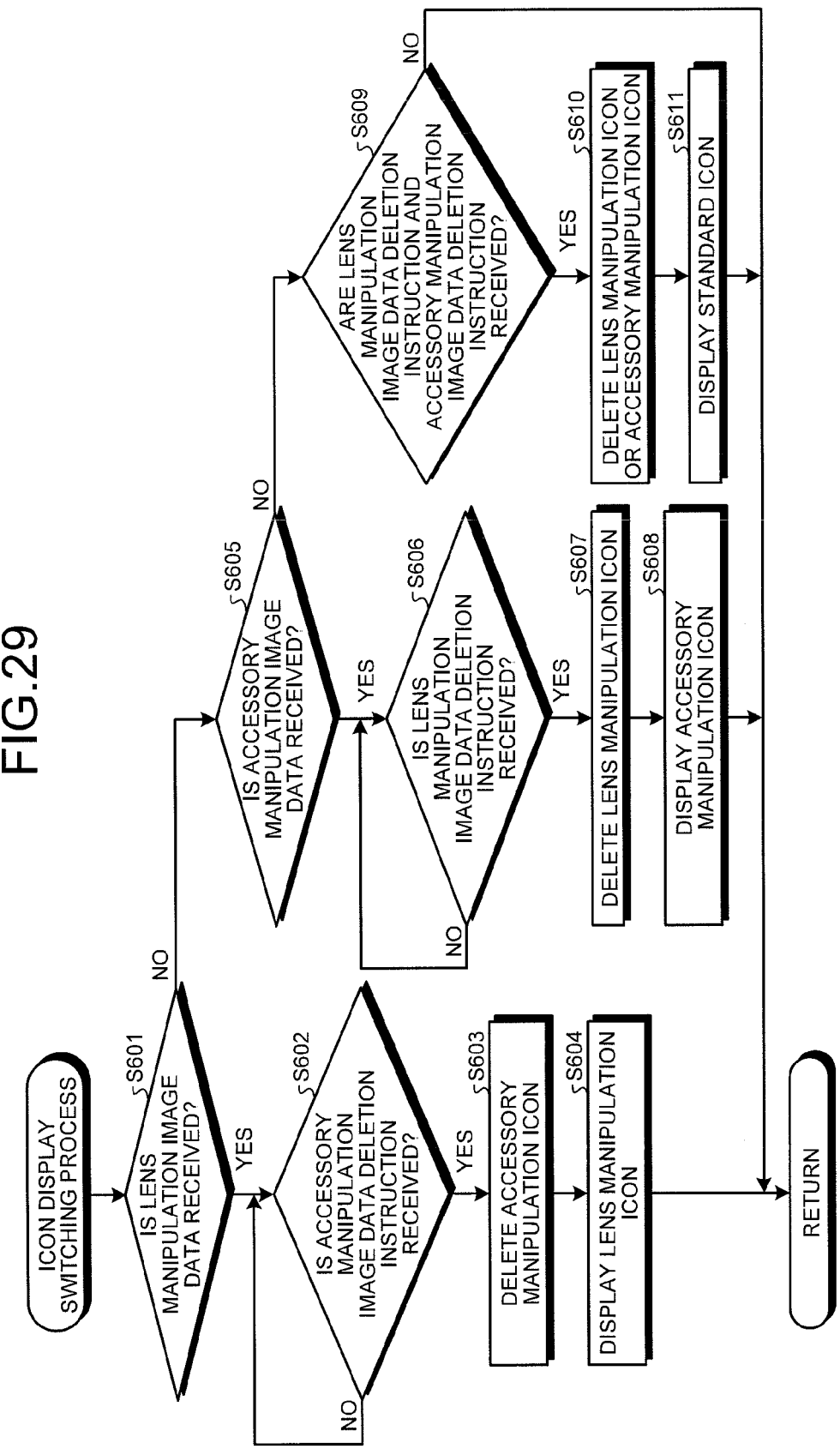
FIG. 29 is a flowchart illustrating an overview of an icon display switching process illustrated in FIGS. 25A and 25B.

Next, an overview of the icon display switching process illustrated in steps S516 and S528 of FIG. 25B will be described. FIG. 29 is a flowchart illustrating an overview of the icon display switching process illustrated in FIG. 25B.

As illustrated in FIG. 29, the BCPU 219 determines whether lens manipulation image data is received from the LCPU 312 via the body communication unit 218 and the lens communication unit 311 (step S601). When the BCPU 219 determines that the lens manipulation image data has been received from the LCPU 312 (Yes in step S601), the BCPU 219 proceeds to step S602 described later. On the other hand, when the BCPU 219 determines that the lens manipulation image data has not been received from the LCPU 312 (No in step S601), the BCPU 219 proceeds to step S605 described later.

In step S602, the BCPU 219 determines whether an accessory manipulation image data deletion instruction is received from the SCPU 516 via the external communication unit 411 and the strobe communication unit 515. When the BCPU 219 determines that the accessory manipulation image data deletion instruction has been received from the SCPU 516 (Yes in step S602), the BCPU 219 proceeds to step S603. On the other hand, when the BCPU 219 determines that the accessory manipulation image data deletion instruction has not been received from the SCPU 516 (No in step S602), the BCPU 219 continues this determination.

Figure 30:
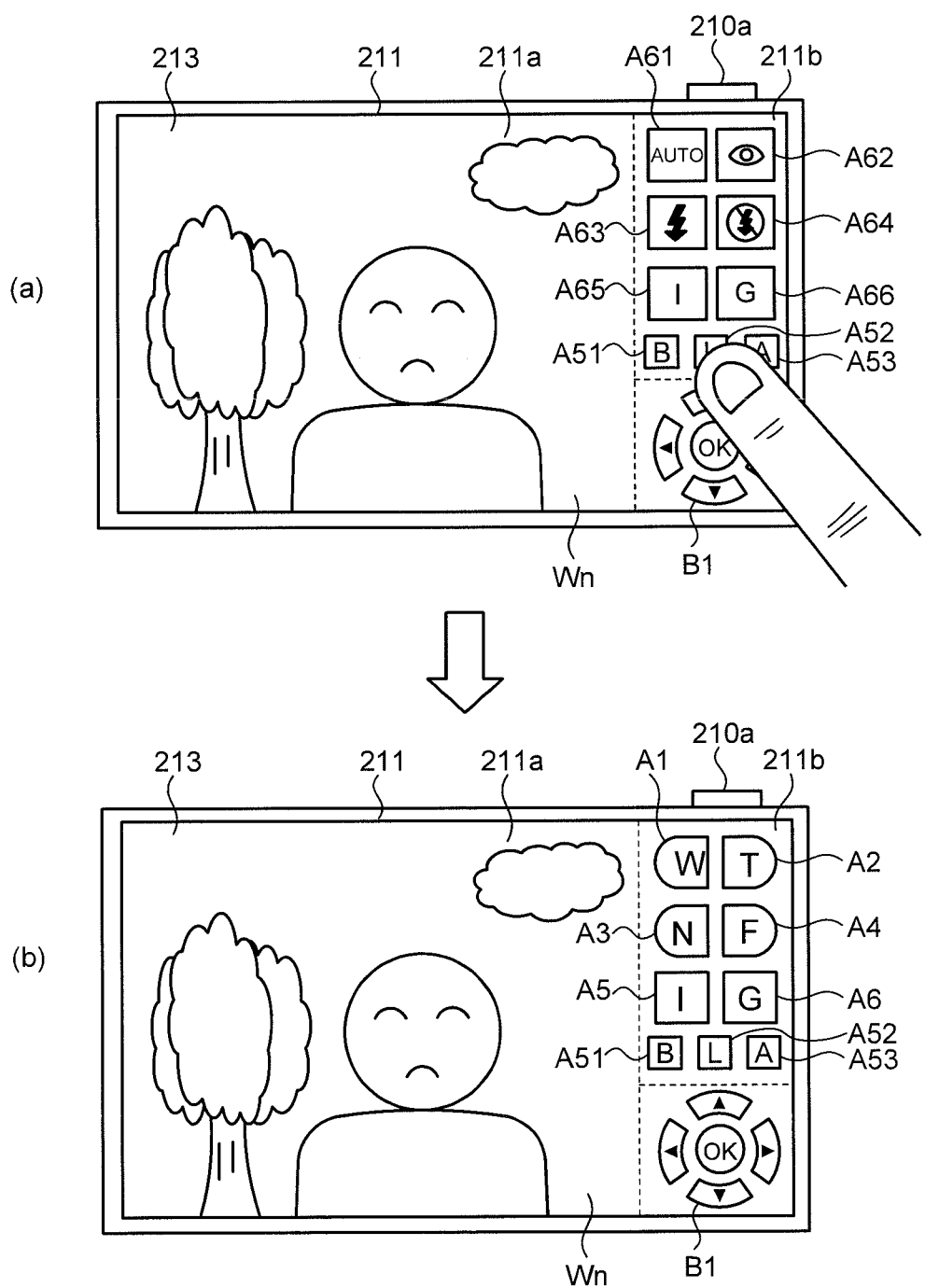
FIG. 30 is a diagram illustrating an example of a screen transition of icons which the control unit displays in the icon manipulation region of the display unit.

Subsequently, the BCPU 219 deletes accessory manipulation icons displayed in the icon manipulation region 211b of the display unit 211 based on the accessory manipulation image data deletion instruction received from the SCPU 516 (step S603), and displays lens manipulation icons corresponding to the lens manipulation image data received from the LCPU 312 in the icon manipulation region 211b of the display unit 211 (step S604). Specifically, as illustrated in FIG. 30, the BCPU 219 deletes accessory manipulation icons (FIG. 30(a)) and displays lens manipulation icons in the icon manipulation region 211b of the display unit 211 (FIG. 30(b)). After that, the BCPU 219 returns to the main routine illustrated in FIG. 25B.

In step S605, the BCPU 219 determines whether accessory manipulation image data is received from the SCPU 516 via the external communication unit 411 and the strobe communication unit 515. When the BCPU 219 determines that the accessory manipulation image data has been received from the SCPU 516 (Yes in step S605), the BCPU 219 proceeds to step S606 described later. On the other hand, when the BCPU 219 determines that the accessory manipulation image data has not been received from the SCPU 516 (No in step S605), the BCPU 219 proceeds to step S609 described later.

In step S606, the BCPU 219 determines whether a lens manipulation image data deletion instruction is received from the LCPU 312 via the body communication unit 218 and the lens communication unit 311. When the BCPU 219 determines that the lens manipulation image data deletion instruction has been received from the LCPU 312 (Yes in step S606), the BCPU 219 proceeds to step S607. On the other hand, when the BCPU 219 determines that the lens manipulation image data deletion instruction has not been received from the LCPU 312 (No in step S606), the BCPU 219 continues this determination.

Subsequently, the BCPU 219 deletes the lens manipulation icons displayed in the icon manipulation region 211b of the display unit 211 based on the lens manipulation image data deletion instruction received from the LCPU 312 (step S607), and displays accessory manipulation icons corresponding to the accessory manipulation image data received from the SCPU 516 in the icon manipulation region 211b of the display unit 211 (step S608). Specifically, as illustrated in FIG. 31, the BCPU 219 deletes the lens manipulation icons (see FIG. 31(a)) and displays accessory manipulation icons in the icon manipulation region 211b of the display unit 211 (FIG. 31(b)). After that, the BCPU 219 returns to the main routine illustrated in FIG. 25B.

In step S609, the BCPU 219 determines whether a lens manipulation image data deletion instruction is received from the LCPU 312 and an accessory manipulation image data deletion instruction is received from the SCPU 516. When the BCPU 219 determines that the lens manipulation image data deletion instruction has been received from the LCPU 312 and the accessory manipulation image data deletion instruction has been received from the SCPU 516 (Yes in step S609), the BCPU 219 proceeds to step S610 described later. On the other hand, when the BCPU 219 determines that the lens manipulation image data deletion instruction has not been received from the LCPU 312 and the accessory manipulation image data deletion instruction has not been received from the SCPU 516 (No in step S609), the BCPU 219 returns to the main routine illustrated in FIG. 25B.

In step S610, the BCPU 219 deletes the lens manipulation icons or the accessory manipulation icons displayed in the icon manipulation region 211b of the display unit 211 based on the lens manipulation image data deletion instruction received from the LCPU 312 and the accessory manipulation image data deletion instruction received from the SCPU 516 (step S610).

Subsequently, the BCPU 219 displays standard icons in the icon manipulation region 211b of the display unit 211 (step S611). After that, the BCPU 219 returns to the main routine illustrated in FIG. 25B.

Figure 32:
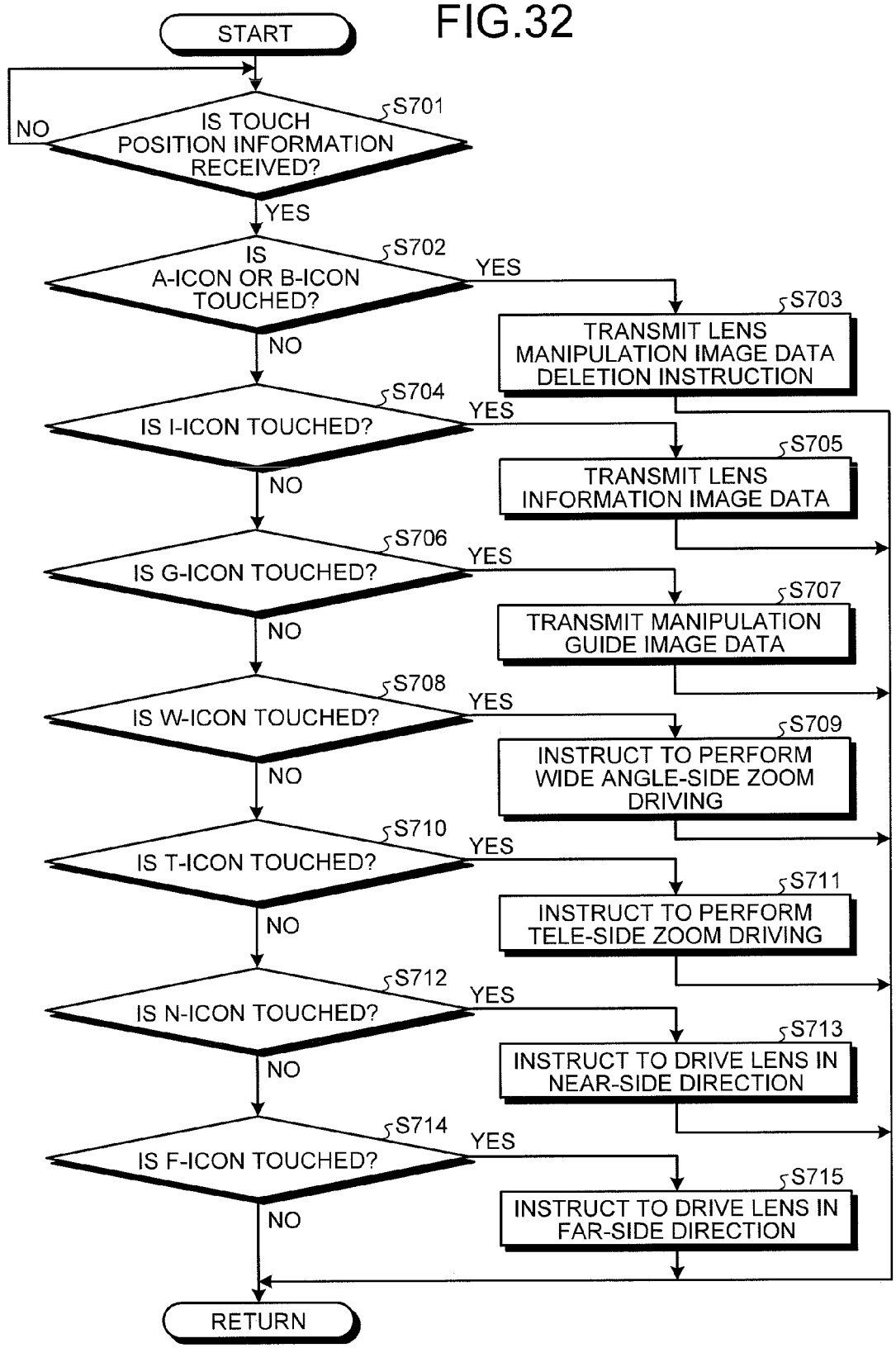
FIG. 32 is a flowchart illustrating an overview of the process performed by a lens controller of a camera system according to a third embodiment of the present invention.

Next, the operation of the LCPU 312 of the camera system 100 according to the third embodiment will be described. FIG. 32 is a flowchart illustrating an overview of the process performed by the LCPU 312.

As illustrated in FIG. 32, the LCPU 312 determines whether the touch position information is received from the BCPU 219 via the body communication unit 218 and the lens communication unit 311 (step S701). When the LCPU 312 determines that the touch position information has been received from the BCPU 219 (Yes in step S701), the LCPU 312 proceeds to step S702. On the other hand, when the LCPU 312 determines that the touch position information has not been received from the BCPU 219 (No in step S701), the LCPU 312 repeats this determination every synchronization cycle.

Subsequently, the LCPU 312 determines whether an A-icon A53 or a B-icon A51 is touched based on the touch position information received from the BCPU 219 (step S702). When the A-icon A53 or the B-icon A51 is touched (Yes in step S702), the LCPU 312 proceeds to step S703. On the other hand, when the LCPU 312 determines that the A-icon A53 or the B-icon A51 has not been touched (No in step S702), the LCPU 312 proceeds to step S704.

In step S703, the LCPU 312 transmits a lens manipulation image data deletion instruction to the BCPU 219 via the body communication unit 218 and the lens communication unit 311 (step S703). After that, the LCPU 312 ends this processing.

Steps S704 to S715 correspond to steps S402 to S413 illustrated in FIG. 16, respectively.

Figure 33:
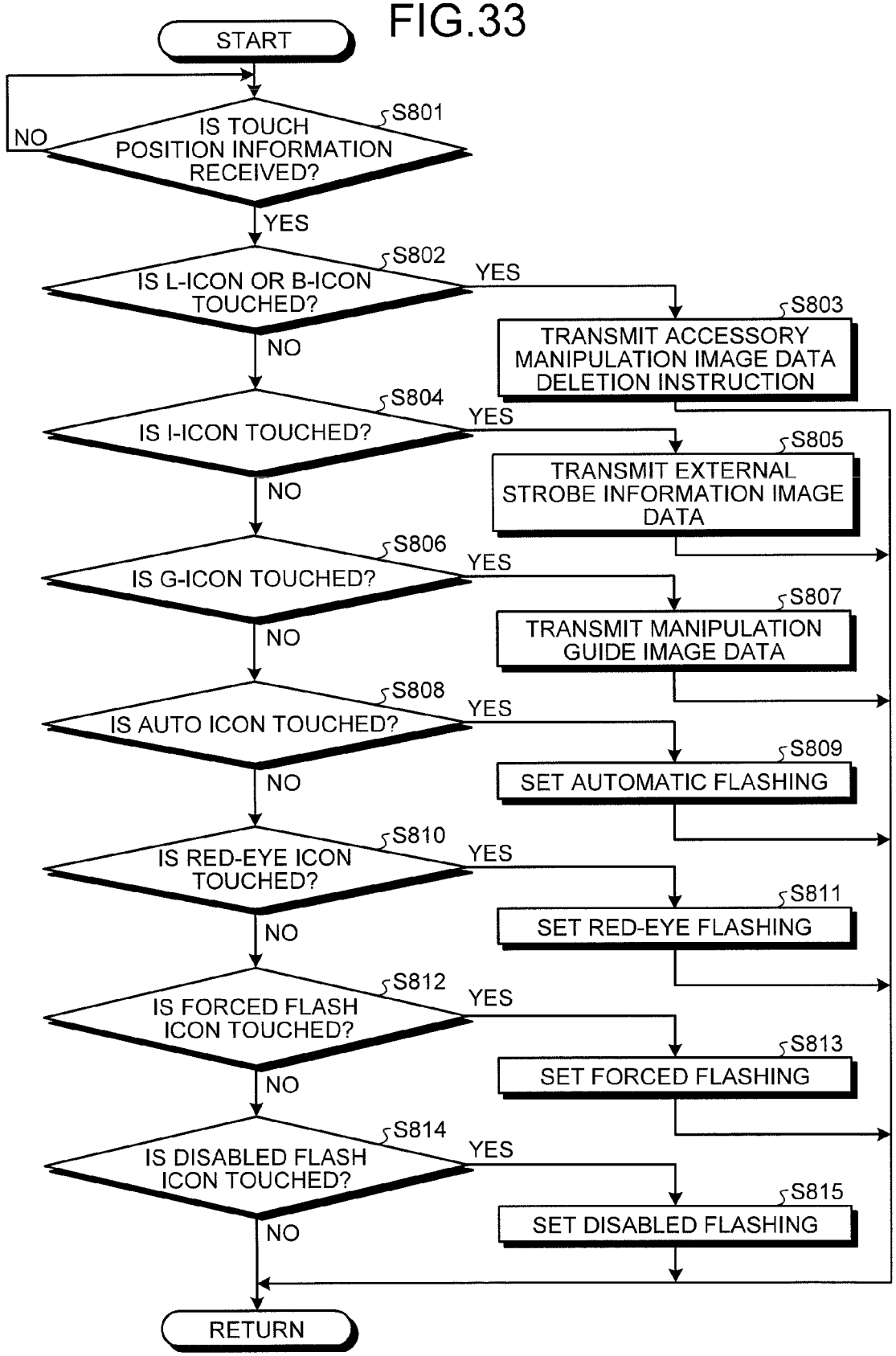
FIG. 33 is a flowchart illustrating an overview of the process performed by a strobe controller of the camera system according to the third embodiment of the present invention.

Next, the operation of the SCPU 516 of the camera system 100 according to the third embodiment will be described. FIG. 33 is a flowchart illustrating an overview of the process performed by the SCPU 516.

As illustrated in FIG. 33, the SCPU 516 determines whether touch position information is received from the BCPU 219 via the external communication unit 411 and the strobe communication unit 515 (step S801). When the SCPU 516 determines that the touch position information has been received from the BCPU 219 (Yes in step S801), the SCPU 516 proceeds to step S802. On the other hand, when the SCPU 516 determines that the touch position information has not been received from the BCPU 219 (No in step S801), the SCPU 516 repeats this determination every synchronization cycle.

Subsequently, the SCPU 516 determines whether an L-icon A52 or a B-icon A51 is touched based on the touch position information received from the BCPU 219 (step S802). When the SCPU 516 determines that the L-icon A52 or the B-icon A51 is touched (Yes in step S802), the SCPU 516 proceeds to step S803 described later. On the other hand, when the SCPU 516 determines that the L-icon A52 or the B-icon A51 has not been touched (No in step S802), the SCPU 516 proceeds to step S804 described later.

In step S803, the SCPU 516 transmits an accessory manipulation image data deletion instruction to the BCPU 219 via the external communication unit 411 and the strobe communication unit 515. After that, the SCPU 516 ends this processing.

In step S804, the SCPU 516 determines whether an I-icon A65 is touched based on the touch position information received from the BCPU 219. When the SCPU 516 determines that the I-icon A65 has been touched (Yes in step S804), the SCPU 516 proceeds to step S805 described later. On the other hand, when the SCPU 516 determines that the I-icon A65 has not been touched (No in step S804), the SCPU 516 proceeds to step S806 described later.

In step S805, the SCPU 516 transmits external strobe information image data to the BCPU 219. In this way, the user can verify the information on the external strobe device 5 from the external strobe information image displayed on the display unit 211. After that, the SCPU 516 ends this processing.

In step S806, the SCPU 516 determines whether a G-icon A66 is touched based on the touch position information received from the BCPU 219. When the SCPU 516 determines that the G-icon A66 has been touched (Yes in step S806), the SCPU 516 proceeds to step S807 described later. On the other hand, when the SCPU 516 determines that the G-icon A66 has not been touched (No in step S806), the SCPU 516 proceeds to step S808 described later.

In step S807, the SCPU 516 transmits a manipulation guide information image of the external strobe device 5 to the BCPU 219 via the external communication unit 411 and the strobe communication unit 515. In this way, the user can understand the manipulation contents of icons by verifying the manipulation guide image of the external strobe device 5 to be displayed on the display unit 211. After that, the SCPU 516 ends this processing.

In step S808, the SCPU 516 determines whether an AUTO icon A61 is touched based on the touch position information received from the BCPU 219. When the SCPU 516 determines that the AUTO icon A61 has been touched (Yes in step S808), the SCPU 516 proceeds to step S809 described later. On the other hand, when the SCPU 516 determines that the AUTO icon A61 has not been touched (No in step S808), the SCPU 516 proceeds to step S810 described later.

In step S809, the SCPU 516 sets automatic flashing which involves causing the strobe 511 to emit light in accordance with the brightness when capturing and ends this processing.

In step S810, the SCPU 516 determines whether a red-eye icon A62 is touched based on the touch position information received from the BCPU 219. When the SCPU 516 determines that the red-eye icon A62 has been touched (Yes in step S810), the SCPU 516 proceeds to step S811 described later. On the other hand, when the SCPU 516 determines that the red-eye image A62 has not been touched (No in step S810), the SCPU 516 proceeds to step S812 described later.

In step S811, the SCPU 516 sets red-eye flashing which involves suppressing the eyes of a subject from appearing red due to the flashing of the strobe 511 and ends this processing.

In step S812, the SCPU 516 determines whether a forced flash icon A63 is touched based on the touch position information transmitted from the BCPU 219. When the SCPU 516 determines that the forced flash icon A63 has been touched (Yes in step S812), the SCPU 516 proceeds to step S813 described later. When the SCPU 516 determines that the forced flash icon A63 has not been touched (No in step S812), the SCPU 516 proceeds to step S814 described later.

In step S813, the SCPU 516 sets forced flashing which involves forcibly causing the strobe 511 to emit light regardless of the brightness when capturing and ends this processing.

In step S814, the SCPU 516 determines whether a disabled flash icon A64 is touched based on the touch position information received from the BCPU 219. When the SCPU 516 determines that the disabled flash icon A64 has been touched (Yes in step S814), the SCPU 516 proceeds to step S815 described later. On the other hand, when the SCPU 516 determines that the disabled flash icon A64 has not been touched (No in step S814), the SCPU 516 ends this processing.

In step S815, the SCPU 516 sets disabled flashing which involves disabling the flashing of the strobe 511 regardless of the brightness when capturing and ends this processing.

According to the third embodiment described hereinabove, it is sufficient that the BCPU 219 acquires manipulation icon data to be deleted from the display unit 211 and manipulation icon data to be displayed subsequently from respective external equipments with an icon manipulation of switching manipulation icons and performs a display switching process based on the acquired data. Thus, even when multiple external equipments are attached to the body portion 4, it is possible to receive various manipulations without upgrading the firmware of the existing body portion 4 or introducing a new body portion 4. As a result, the user can perform the unique manipulations of the replacement lens device 3 or new manipulations. Furthermore, since the LCPU 312 and the SCPU 516 perform the processes of the replacement lens device 3 and the external strobe device 5, respectively, it is possible to perform various manipulations even if the processing capability of the BCPU 219 is not so high.

Fourth Embodiment

Next, a fourth embodiment of the present invention will be described. In the camera system according to the fourth embodiment of the present invention, the lens manipulation data storage unit and the strobe manipulation data are different from those of the camera system according to the third embodiment described above. Moreover, in the camera system according to the fourth embodiment of the present invention, the process performed by the BCPU is different from that of the above embodiment. Thus, in the following description, first, the lens manipulation data stored in the lens manipulation data storage unit will be described. Then, the process performed by the BCPU 219 will be described. In the drawings, the same portions will be denoted by the same reference numerals.

FIG. 34 is a diagram illustrating an example of a lens manipulation data table as the lens manipulation data stored in the lens manipulation data storage unit 309a.

As illustrated in FIG. 34, a manipulation type, an icon display position, an icon display size, an icon image, an attribute, and manipulation correspondence data are described in a lens manipulation data table T4. For example, an icon display position of (10,15), an icon display size of 30×30, an icon image of image data 1, an attribute of 01, and manipulation correspondence data of command information 1 (driving command, stop command) are described for a manipulation type of wide-side zoom driving. Moreover, an icon display position of (60,65), an icon display size of 30×30, an icon image of image data 4, an attribute of 01, and manipulation correspondence data of command information 4 (driving command, stop command) are described for a manipulation type of far-side focus driving.

As above, the lens manipulation data storage unit 309a stores manipulation icon data and manipulation correspondence data in correlation. Since the strobe manipulation data stored in the strobe manipulation data storage unit 513a has substantially the same contents, and description thereof will not be provided.

Figure 35A:
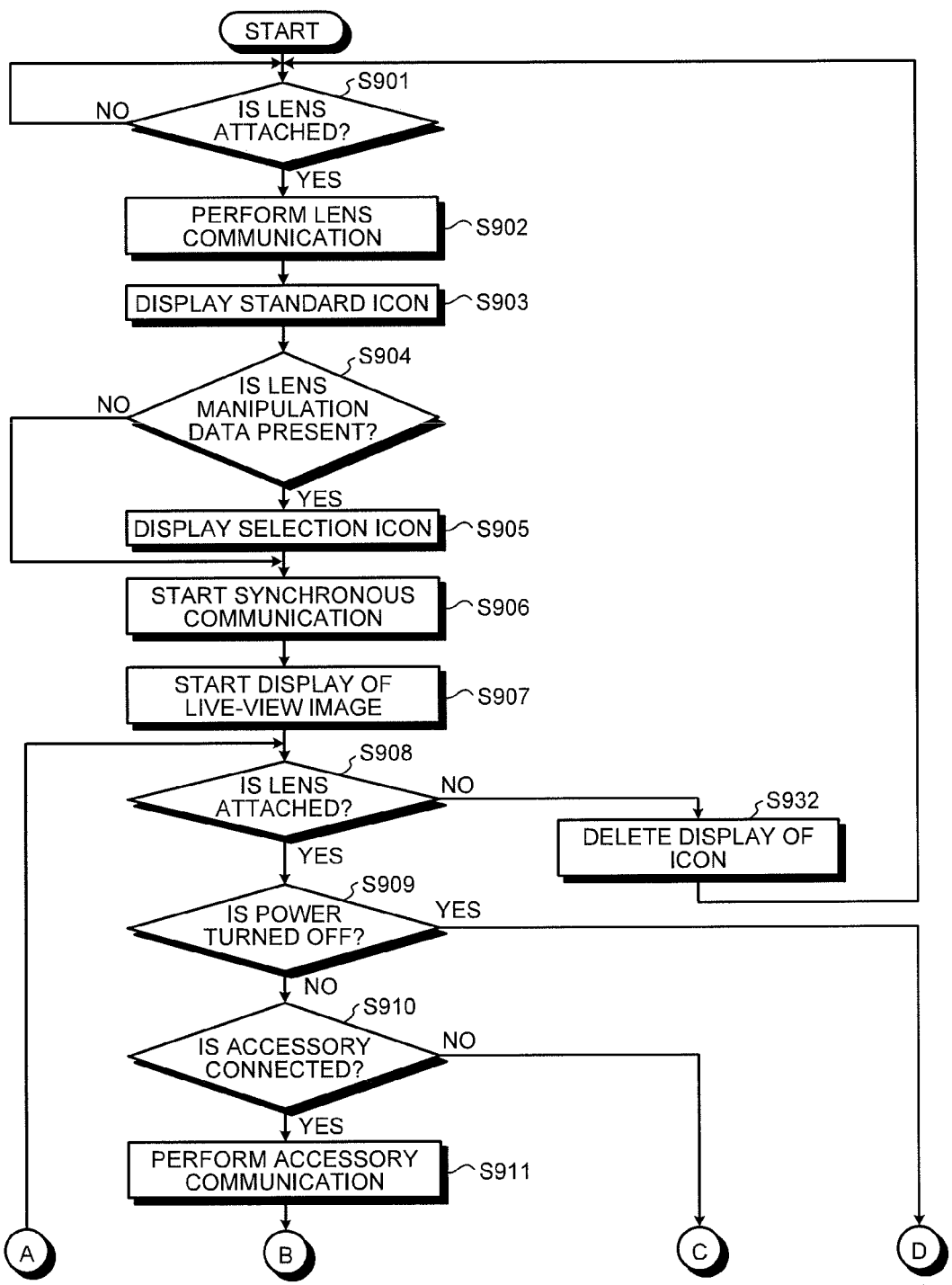
FIGS. 35A and 35B are flowcharts illustrating an overview of the process performed by the camera system according to the fourth embodiment of the present invention.
Figure 35B:
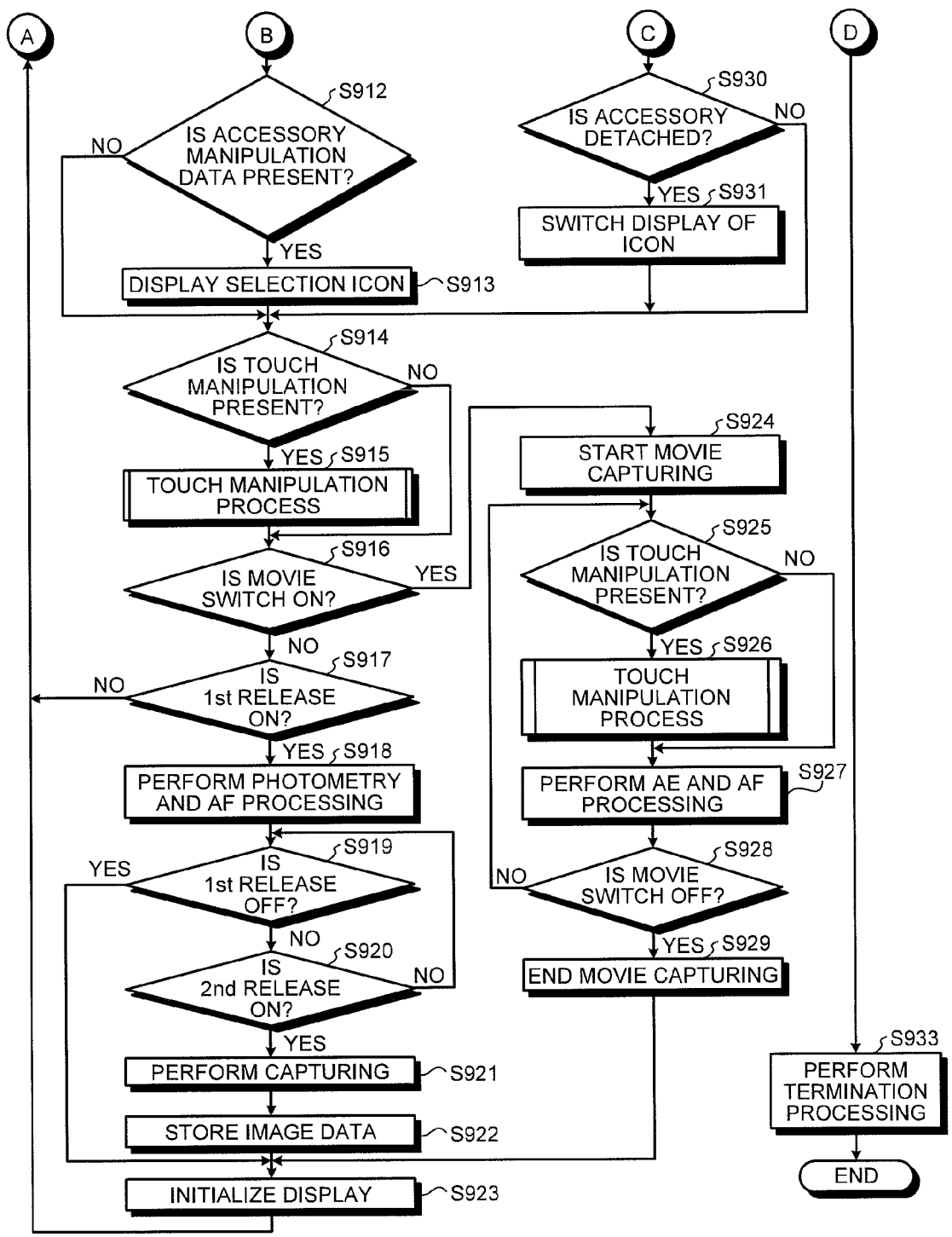

Next, the operation of the camera system 100 according to the fourth embodiment will be described. FIGS. 35A and 35B are flowcharts illustrating an overview of the process performed by the camera system 100.

In FIGS. 35A and 35B, steps S901 to S914 correspond to steps S501 to S514 illustrated in FIGS. 25A and 25B, respectively. In step S902, the BCPU 219 acquires optical data, lens manipulation data, and lens driving data at once from the LCPU 312 via the body communication unit 218 and the lens communication unit 311 and stores the data in the SDRAM 215.

In step S915, the BCPU 219 executes a touch manipulation process of performing various capturing manipulations on the camera system 100 in accordance with the touch position. The contents of the touch manipulation process will be described later.

Steps S916 to S925 correspond to steps S517 to S526 illustrated in FIG. 25B, respectively.

In step S926, the BCPU 219 executes the same touch manipulation process as step S915. The contents of the touch manipulation process will be described later.

Steps S927 to S933 correspond to steps S529 to S535 illustrated in FIGS. 25A and 25B, respectively. After step S933, the camera system 100 ends this processing.

Figure 36:
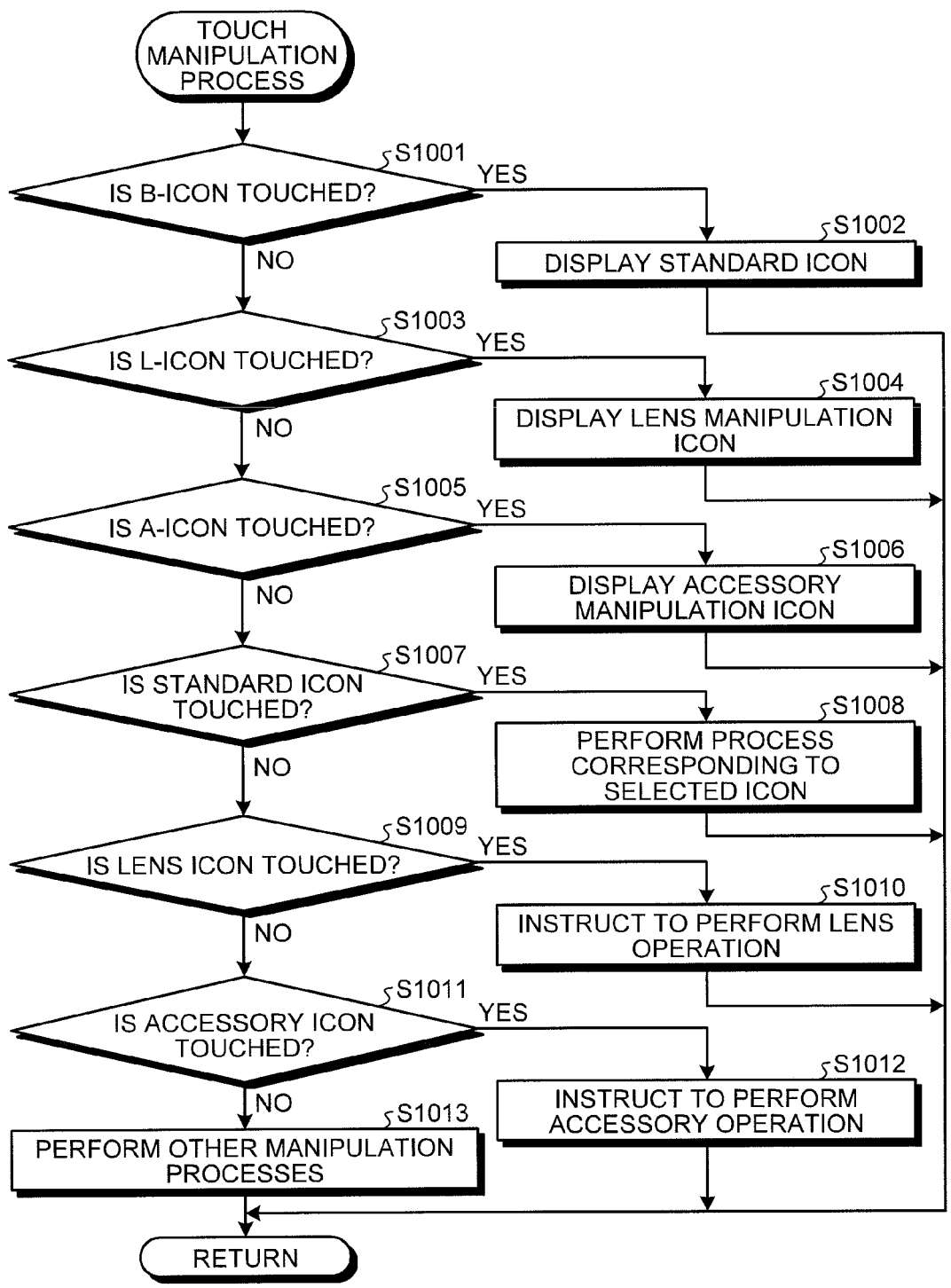
FIG. 36 is a flowchart illustrating an overview of a touch manipulation process illustrated in FIGS. 35A and 35B.

Next, the touch manipulation process of steps S915 and S926 illustrated in FIG. 35B will be described. FIG. 36 is a flowchart illustrating an overview of the touch manipulation process illustrated in FIG. 35B.

In FIG. 36, the BCPU 219 determines whether the B-icon A51 (see FIG. 28) is touched (step S1001). When the BCPU 219 determines that the B-icon A51 has been touched (Yes in step S1001), the BCPU 219 displays standard icons in the icon manipulation region 211b of the display unit 211 (step S1002). After that, the camera system 100 returns to the main routine illustrated in FIG. 35B. On the other hand, when the BCPU 219 determines that the B-icon A51 has not been touched (No in step S1001), the camera system 100 proceeds to step S1003.

Subsequently, the BCPU 219 determines whether the L-icon A52 is touched (step S1003). When the BCPU 219 determines that the L-icon A52 has been touched (Yes in step S1003), the BCPU 219 displays lens manipulation icons corresponding to the lens manipulation data included in the lens data acquired from the LCPU 312 in the icon manipulation region 211b of the display unit 211 (step S1004). After that, the camera system 100 returns to the main routine illustrated in FIG. 35B. On the other hand, when the BCPU 219 determines that the L-icon A52 has not been touched (No in step S1003), the camera system 100 proceeds to step S1005.

After that, the BCPU 219 determines whether the A-icon A53 is touched (step S1005). When the BCPU 219 determines that the A-icon A53 has been touched (Yes in step S1005), the BCPU 219 displays accessory manipulation icons corresponding to the strobe manipulation data included in the strobe data acquired from the SCPU 516 in the icon manipulation region 211b of the display unit 211 (step S1006). After that, the camera system 100 returns to the main routine illustrated in FIG. 35B. On the other hand, when the BCPU 219 determines that the A-icon A53 has not been touched (No in step S1005), the camera system 100 proceeds to step S1007.

Subsequently, the BCPU 219 determines whether one of the standard icons (A41 to A46) is touched when the display unit 211 displays the standard icons (see FIG. 27) in the icon manipulation region 211b (step S1007). When the BCPU 219 determines that one of the standard icons has been touched (Yes in step S1007), the BCPU 219 executes a process corresponding to the selected standard icon (step S1008). For example, when a mode icon A41 is selected, the BCPU 219 displays information on a shooting mode on the display unit 211. After that, the camera system 100 returns to the main routine illustrated in FIG. 35B. On the other hand, when the BCPU 219 determines that any one of the standard icons has not been touched (No in step S1007), the camera system 100 proceeds to step S1009.

After that, the BCPU 219 determines whether one of the lens icons A1 to A6 is touched when the display unit 211 displays the lens icons (see FIG. 30(b)) in the icon manipulation region 211b (step S1009). When the BCPU 219 determines that one of the lens icons has been touched (Yes in step S1009), the BCPU 219 instructs the replacement lens device 3 to perform a lens operation corresponding to the selected lens icon (step S1010). For example, when the W-icon A1 is selected, the BCPU 219 transmits a driving command corresponding to the command information 1 to the LCPU 312 via the body communication unit 218 and the lens communication unit 311 by referring to the lens manipulation data table T4 acquired from the LCPU 312 and causes the replacement lens device 3 to execute the driving command. After that, the camera system 100 returns to the main routine illustrated in FIG. 35B. On the other hand, when the BCPU 219 determines that any one of the lens icons has not been touched (No in step S1009), the camera system 100 proceeds to step S1011.

Subsequently, the BCPU 219 determines whether one of the accessory icons A61 to A64 is touched when the display unit 211 displays the accessory icons (see FIG. 31(b)) in the icon manipulation region 211b (step S1011). When the BCPU 219 determines that one of the accessory icons A61 to A64 has been touched (Yes in step S1011), the BCPU 219 instructs the external strobe device 5 to perform an accessory operation corresponding to the selected accessory icon (step S1012). For example, when the AUTO icon A61 is selected, the BCPU 219 transmits a driving command corresponding to the command information to the SCPU 516 via the external communication unit 411 and the strobe communication unit 515 by referring to a strobe manipulation table (not illustrated) acquired from the SCPU 516 and causes the external strobe device 5 to execute the driving command. After that the camera system 100 returns to the main routine illustrated in FIG. 35B. On the other hand, when the BCPU 219 determines that any one of the accessory icons has not been touched (No in step S1011), the camera system 100 proceeds to step S1013.

In step S1013, the BCPU 219 executes other manipulation processes. Specifically, the BCPU 219 executes a manipulation process corresponding to a select icon B1. After that, the camera system 100 returns to the main routine illustrated in FIG. 35B.

According to the fourth embodiment of the present invention described hereinabove, the BCPU 219 displays a manipulation image corresponding to the manipulation image data included in the manipulation information transmitted from the LCPU 312 on the display unit 211. Moreover, when the touch panel 213 outputs the touch position information on the manipulation image, the BCPU 219 instructs the operation of the replacement lens device 3 at once based on the operation information determined by the touch position information and the manipulation image. As a result, it is possible to immediately drive the replacement lens device 3.

Other Embodiments

In the embodiments described above, although the operation flow in the claims, the specification, and the drawings has been described using the expression of "first" and "subsequently" for the sake of convenience, it is not intended that the operation is not essentially performed in that order.

In the embodiments described above, although the replacement lens device is attached to the lens mount, a projector that projects images may be attached, for example, so that images can be projected with a manipulation from the body portion.

Moreover, in the embodiments described above, although the accessory external equipment has been connected to the hot shoe, an accessory port capable of communicating bi-directionally with external equipment may be provided besides the hot shoe, for example, so that the external equipment is connected to the accessory port. In this case, the communication may be performed in a wired or wireless manner.

Furthermore, in the embodiments described above, although a digital single-lens reflex camera has been described as an example of the imaging apparatus, the present invention can be applied to electronic equipment such as a digital camera to which accessories can be attached, a digital video camera, and a mobile phone and a tablet mobile equipment which have an image capturing function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera system including a body portion and external equipment that is detachable from the body portion,
   wherein the external equipment includes:
   a body communication unit that communicates with the body portion; and
   a storage unit that stores manipulation information including manipulation image data corresponding to a manipulation type of the camera system and operation information related to an operation of the camera system corresponding to the manipulation type, and
   wherein the body portion includes:
   an imaging unit that images a subject image;
   an external equipment communication unit that communicates with the external equipment;
   a display unit that displays information related to the external equipment; and
   a control unit that receives the manipulation information and the operation information from the external equipment when the external equipment is attached to the body portion, causes the display unit to display the manipulation image data based on the manipulation information, performs control so that the camera system performs an operation based on the operation information, and performs control so that the manipulation image data is removed from the display unit when the external equipment is detached from the body portion.

2. The camera system according to claim 1, wherein
   the storage unit stores manipulation information including the size of a manipulation image corresponding to the manipulation image data and a display position of the manipulation image on the display unit when the manipulation image data is displayed on the display unit.

3. The camera system according to claim 1, wherein
   the body communication unit and the external equipment communication unit perform communication in synchronization with an imaging signal of the camera system.

4. The camera system according to claim 1, wherein
   the storage unit stores manipulation information including external equipment information related to the external equipment and guide information for manipulating the external equipment.

5. The camera system according to claim 4, wherein
   when a manipulation of displaying the external equipment information related to the external equipment is performed, the control unit acquires the external equipment information from the external equipment and performs control so that the external equipment information is displayed on the display unit, and
   when a manipulation of displaying the guide information for manipulating the external equipment is performed, the control unit acquires the guide information from the external equipment and performs control so that the guide information is displayed on the display unit.

6. The camera system according to claim 1, wherein
when a manipulation is performed on the external equipment, the control unit deletes a part of the manipulation image data, acquires information related to the manipulation from the external equipment, and performs control so that the information related to the manipulation is displayed on the display unit.

7. The camera system according to claim 1, wherein
when a plurality of external equipment is attached to the body portion, the control unit acquires the manipulation information and the operation information from each of the external equipment, causes images representing the external equipment to be displayed on the display unit, and performs control so that one of the external equipment can be manipulated and selected, and when one of the external equipment is selected, the control unit deletes a part of the images representing the external equipment, acquires information related to the manipulation from the selected external equipment, and performs control so that the information related to the manipulation is displayed on the display unit.

8. External equipment which can be electrically connected to or disconnected from a body portion including a touch panel and controlling display and manipulation, the external equipment comprising:
 a storage unit that stores (1) image data for displaying an image representing a manipulation type corresponding to the external equipment, (2) manipulation data including display position data for displaying the image data on the touch panel, and (3) driving data including driving information of the external equipment corresponding to the manipulation type;
 a communication unit that transmits the image data and the manipulation data to the body portion and receives touch position information representing a position touched on the touch panel of the body portion; and
 a control unit that controls driving of the external equipment, when the touch position information is received, based on the received touch position information and operation information determined by the driving data.

9. The external equipment according to claim 8, wherein
the communication unit receives the touch position information in synchronization with an imaging signal.

10. The external equipment according to claim 8, wherein
when a manipulation is performed on the external equipment, the control unit deletes a part of the image data and transmits information related to the manipulation to the body portion and performs control so that the body portion displays the information related to the manipulation.

11. The external equipment according to claim 8, wherein
when a plurality of external equipment are attached to the body portion, the control unit transmits the manipulation information and the operation information of each of the external equipment to the body portion, causes images representing the external equipment to be displayed, and performs control so that one of the external equipment can be manipulated and selected, and when one of the external equipment is selected, the control unit deletes a part of the images representing the external equipment from the display, transmits information related to the manipulation to the body portion, and performs control so that the information related to the manipulation is displayed on the touch panel.

12. The external equipment according to claim 8 further comprising an imaging unit that captures a subject image and outputs captured image data,
 wherein the communication unit transmits, to the main portion along with the image data for displaying an image representing a manipulation type corresponding to the external equipment, the captured image data for simultaneously displaying a live-view image.

* * * * *